US007987088B2

(12) United States Patent
Moitra et al.

(10) Patent No.: US 7,987,088 B2
(45) Date of Patent: Jul. 26, 2011

(54) SYSTEM AND METHOD FOR AUTOMATING THE GENERATION OF AN ONTOLOGY FROM UNSTRUCTURED DOCUMENTS

(75) Inventors: Abha Moitra, Scotia, NY (US); Andrew Walter Crapo, Scotia, NY (US); Michael Allen Bodkin, Orlando, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 1289 days.

(21) Appl. No.: 11/491,627

(22) Filed: Jul. 24, 2006

(65) Prior Publication Data

US 2008/0021700 A1 Jan. 24, 2008

(51) Int. Cl.
*G06F 21/00* (2006.01)
*G10L 15/00* (2006.01)

(52) U.S. Cl. ............ 704/10; 704/9; 707/699; 707/705; 707/711

(58) Field of Classification Search .............. 704/10
See application file for complete search history.

(56) References Cited

U.S. PATENT DOCUMENTS

| | | | | |
|---|---|---|---|---|
| 6,076,088 | A * | 6/2000 | Paik et al. | 707/5 |
| 6,101,492 | A * | 8/2000 | Jacquemin et al. | 707/3 |
| 6,263,335 | B1 * | 7/2001 | Paik et al. | 707/5 |
| 6,363,378 | B1 * | 3/2002 | Conklin et al. | 707/5 |
| 6,389,409 | B1 * | 5/2002 | Horovitz et al. | 707/2 |
| 6,405,190 | B1 * | 6/2002 | Conklin | 707/3 |
| 6,415,283 | B1 * | 7/2002 | Conklin | 707/3 |
| 6,513,027 | B1 * | 1/2003 | Powers et al. | 706/47 |
| 2003/0033288 | A1 * | 2/2003 | Shanahan et al. | 707/3 |
| 2003/0120640 | A1 * | 6/2003 | Ohta et al. | 707/3 |
| 2004/0243645 | A1 * | 12/2004 | Broder et al. | 707/200 |
| 2005/0210008 | A1 | 9/2005 | Tran et al. | 707/3 |
| 2006/0020466 | A1 | 1/2006 | Cousineau et al. | 704/257 |
| 2006/0031288 | A1 | 2/2006 | Ter Horst et al. | 709/204 |
| 2006/0053151 | A1 | 3/2006 | Gardner et al. | 707/102 |
| 2006/0053175 | A1 | 3/2006 | Gardner et al. | 707/203 |
| 2006/0059028 | A1 | 3/2006 | Eder | 705/7 |

OTHER PUBLICATIONS

ISI Ontosaurus from http://www.isi.edu/isd/ontosaurus.html (Oct. 11, 2006); 4 pages.
Air Tasking Order. From Teknowledge at http://reliant.teknowledge.com/DAML/ATO_Ontology.owl (Oct. 11, 2006); 10 pages.
Berners-Lee, T., Hendler, J., Lassila, O.: "The Semantic Web:" Scientific American, (May 17, 2001). Available online at http://www.scientificamerican.com/article.cfm? articleID=00048144-10D2-1C70-84A9809EC588EF21&catID=2 (Oct. 11, 2006): 10 pages.
Brickley, D., Guha, R.V.: "RDF Vocabulary Description Language 1.0: RDF Schema" (2004). Available online at http://www.w3.org/TR/rdf-schema/ (Oct. 11, 2006); 24 pages.
British National Corpus. http://www.natcorp.ox.ac.uk/ (Oct. 11, 2006); 1 page.
Buitelaar, P., Sintek, M.: "OntoLT version 1.0: Middleware for Ontology Extraction from Text" 3rd International Semantic Web Conference, (2004); 4 pages.

(Continued)

*Primary Examiner* — Justin Rider
(74) *Attorney, Agent, or Firm* — Withrow & Terranova, PLLC

(57) ABSTRACT

Systems and methods for the substantially automatic creation of ontologies from unstructured documents identify phrases and core noun phrases from the respective documents. Links can be extracted from the documents. Concepts can be identified from the documents. Ontologies can be automatically created for the documents. The processing is domain independent.

25 Claims, 39 Drawing Sheets

OTHER PUBLICATIONS

Faure, D., Nedellec, C. A.: "Corpus-based Conceptual Clustering Method for Verb Frames and Ontology Acquisition;" ICLREC Workshop—Granada, Spain (1998); 29 pages.

"Jena 2—A Semantic Web Framework;"Available online at http://www.hpl.hp.com/semweb/jena2.htm (Oct. 11, 2006); 1 page.

Horridge, M.: "OWLViz—A Visualization Plugin for the Protégé OWL Plugin;" Available online at http://www.co-ode.org/downloads/owlviz/co-ode-index.php (Oct. 11, 2006); 3 pages.

Kaon 2005 Tool Suite, see home page at http://kaon.semanticweb.org/ (Oct. 11, 2006); 2 pages.

Lenat, D.B.: "CYC: A Large-scale Investment in Knowledge Infrastructure. Communications of the ACM;" vol. 38, No. 11, (Nov. 1995) p. 32-38.

Maedche, A., Siaab, S.: "Semi-automatic Engineering of Ontologies from Text;" In Proceedings of the 12th International Conference on Software Engineering and Knowledge Engi-neering, (2000); Available online at http://www.aifb.uni-karlsruhe.de/WBS/Publ/2000/seke_amasst_2000.pdf (Oct. 11, 2006); 8 pages.

McGuinness, D.L., van Harmelen, F.: "OWL Web Ontology Language Overview;" Available online at http://www.w3.org/TR/owl-features/ (Oct. 11, 2006); 17 pages.

Miller, G.A.: "WordNet: A Lexical Database for English;" Communications of the ACM, 38(11) (Nov. 1995) p. 39-41; Available online at http://delivery.acm.org/10.1145/220000/219748/p39-miller.pdf?key1=219748&key2=2592383511&coll=GUIDE&dl=GUIDE&CFID=15151515&CFTOKEN=6184618 (Oct. 11, 2006).

Miller, E., Swick, R., Brickley, D.: "Resource Description Framework (RDF);" Available online at http://www.w3.org/RDF/ (Oct. 11, 2006); 7 pages.

Miller, E., Hendler, J.: Web Ontology Language (OWL); Tools, Projects, and Applications; Available online at http://www.w3.org/2004/OWL/#projects (Oct. 11, 2006); 3 pages.

Missikoff, M., Navigli, R., Velardi, P.: "Integrated Approach to Web Ontology Learning and Engineering;" IEEE-Computer Nov (Nov. 2002) p. 60-63.

Monte, T. et al.: "T.: Doodle-Owl: OWL-based Semi-automatic Ontology Development Environment;" Prepared for 3rd International Semantic Web Conference (2004) p. 33-36.

19. Nelson, S.J. et al., Abstract: "Identifying Concepts in Medical Knowledge;" In Proc. of 8th World Congress on Medical Informatics (MEDINFO), (1995) p. 35-36.

Noy, N. F.: "Prompt" Available online at http://protege.stanford.edu/plugins/prompt/prompt.html (Oct. 11, 2006); 2 pages.

Noy, N.F., McGuinness, D.L.: "Ontology Development 101: A Guide to Creating Your First Ontology," Stanford Knowledge Systems Laboratory Technical Report KSL-01-05 (2001); Available online at http://protege.stanford.edu/publications/ontology_development/ontology101-noy-mcguinness.html(10/11/2006): 21 pages.

Pease, A.: "Suggested Upper Merged Ontology (SUMO);" Available online at http://www.ontologyportal.org/ (Oct. 11, 2006), 2 pages.

Protégé.: "Welcome to Protégé:" Available online at http://protege.stanford.edu/ (Oct. 11, 2006), 2 pages.

Sleeman. D. et al.: "Enabling Services for Distrib-uted Environments, Ontology Extraction and Knowledge Base Characterization," Proceed-ings of Workshop on Knowledge Transformations for the Semantic Web, held at ECAI-02, Lyons, France, Jul. 2002: 8 pages.

Stanford Medical Informatics.: Protégé OWL Plugin: Ontology Editor for the Semantic Web. Available online at http://protege.stanford.edu/plugins/owl/ (Oct. 11, 2006): 1 page.

Stuart, I.: "XML Namespaces Explained;" (Nov. 27, 2002), Available online at http://www.sitepoint.com/article/xml-namespaces-explained (Oct. 11, 2006); 9 pages.

Tomokiyo, T., Hurst, M. A.: "A Language Model Approach to Keyphrase Extraction;" In ACL-2003 Workshop on Multiword Expressions: Analysis, Acquisition and Treatment; 8 pages.

Weischedel, R., et al. "Coping with Ambi-guity and Unknown Words through Probabilistic Models;" Computational Linguistics 19(2) (1993) 359-382.

Welty, C., Guarino, N.: "Support for Ontological Analysis of Taxonomic Relationships;" Data and Knowledge Eng. 39(1) (2001) 51-74.

Yang, H., et al.: "Extracting Ontologies from Legacy Systems for Under-standing and Re-engineering;" In IEEE Int'l Conf on Computer Softwre & Applicatns, 1999, 6 pages.

Schorr, H.; Final Report: "Ontologies, Knowledge Bases and Knowledge Management;" USC Information Sciences Institute; (Apr. 9, 1997); 76 pages.

Cycorp, Inc.; "What is Cyc?" (prior to Jul. 24, 2005); Available online at http://wwww.cyc,com/cyc/technology/whatiscyc (Feb. 16, 2006); 2 pages.

"Semantic Knowledge Source Integration;" Cycorp, Inc. (2004); 1 page.

"Cyc Enhancement of Informaiton Extraction;" Cycorp, Inc. (2004); 4 pages.

"Aerotext (TM): Technology for Extracting Intellegence from Text;" Lockheed Martin Corp. (2005); 2 pages.

"AeroText Products Executive Summary Information;" Lockheed Martin Corp. (May 2003) 21 pages.

Smith, B.: "The Ontology of Documents and the Technology of Identification;" CERIAS (Nov. 2, 2005); 2 pages.

"Semi-Automatic Ontology Eng and Ontology Supported Document Indexing in a Multilinguar Environmnt;" at http://www.diplomica.com/db/diplomabeiten6905.html (11/15/05) 6 pages.

Birgitta Konig-Ries, M.K.: "An Ontology-Based Document-Space as an Adaptable User Interface for Mobile Information Systems;" 5 pages (prior to Jul. 24, 2005).

Motta, E. et al,. "Ontology-Driven Document Enrichment: Principles, Tools and Applicaitons;" To appear in the Int'l J. of Human-Comp. Studies, 41 pp. (prior to Jul. 24, 2005).

Lockheed Martin, Inc., "AEROTEXT ™", Technology for Extracting Intelligence from Text, Sales Pamphlet, © 2005, 2 pages.

Lockheed Martin, Inc., "AeroText ™ Products Executive Summary Information", © 2001-2003, 21 pages.

Cerias, Purdue University, "The Ontology of Documents and the Technology of Identification", Seminar, Nov. 2, 2005, Speaker-Barry Smith, Pamphlet, 2 pages.

Absolventen Kongress, Nov. 23/24, 2005, "Katalog" for Semi-automatic ontology ontology supported document indexing in a multilingual environment, Diplomica GmbH, www.diploma.de , 6 pages.

Michael Klein Birgitta Konig-Ries, "An Ontology-Based Document-Space as an Adaptable User Interface for Mobile INformation Systems", University of Karlsruhe, Germany, http://ww.ipd.uni-karlsruhe.de/DIANE , 5 pages, published on or before Jun. 30, 2005.

Enrico Motta, Simon Buckingham Shum and John Domingue, "Ontology-Driven Document Enrichment: Principles, Tools and Applications", Knowledge Media Institute, The Open University, Milton Keynes, UK, {e.motta, s.buckingham.shum, j.b.dominque}@open.ac.uk, 41 pages, published on or before Jun. 30, 2005.

* cited by examiner

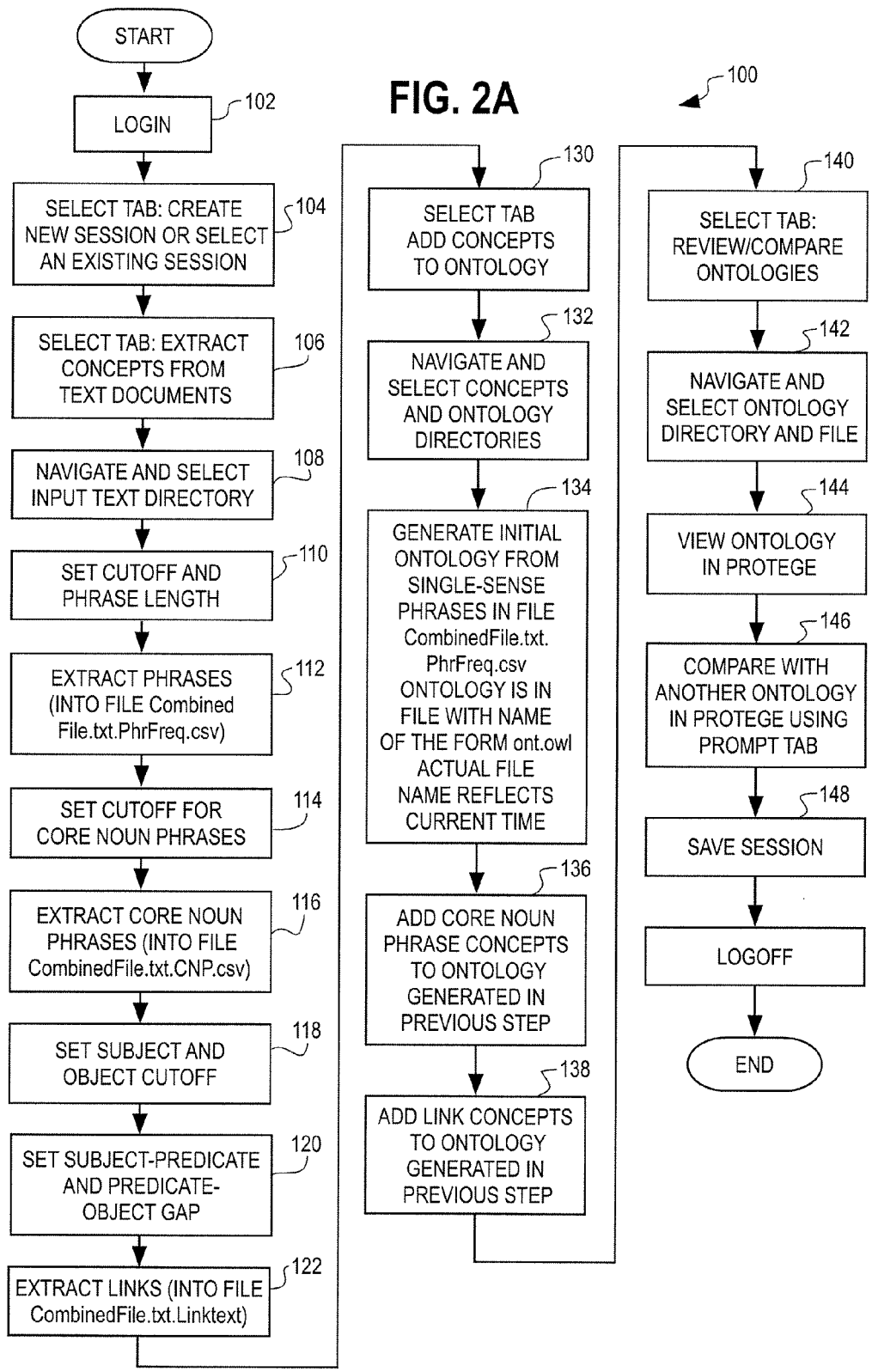

EXTRACT PHRASES (INTO FILE CombinedFile.txt.PhrFreq.csv)

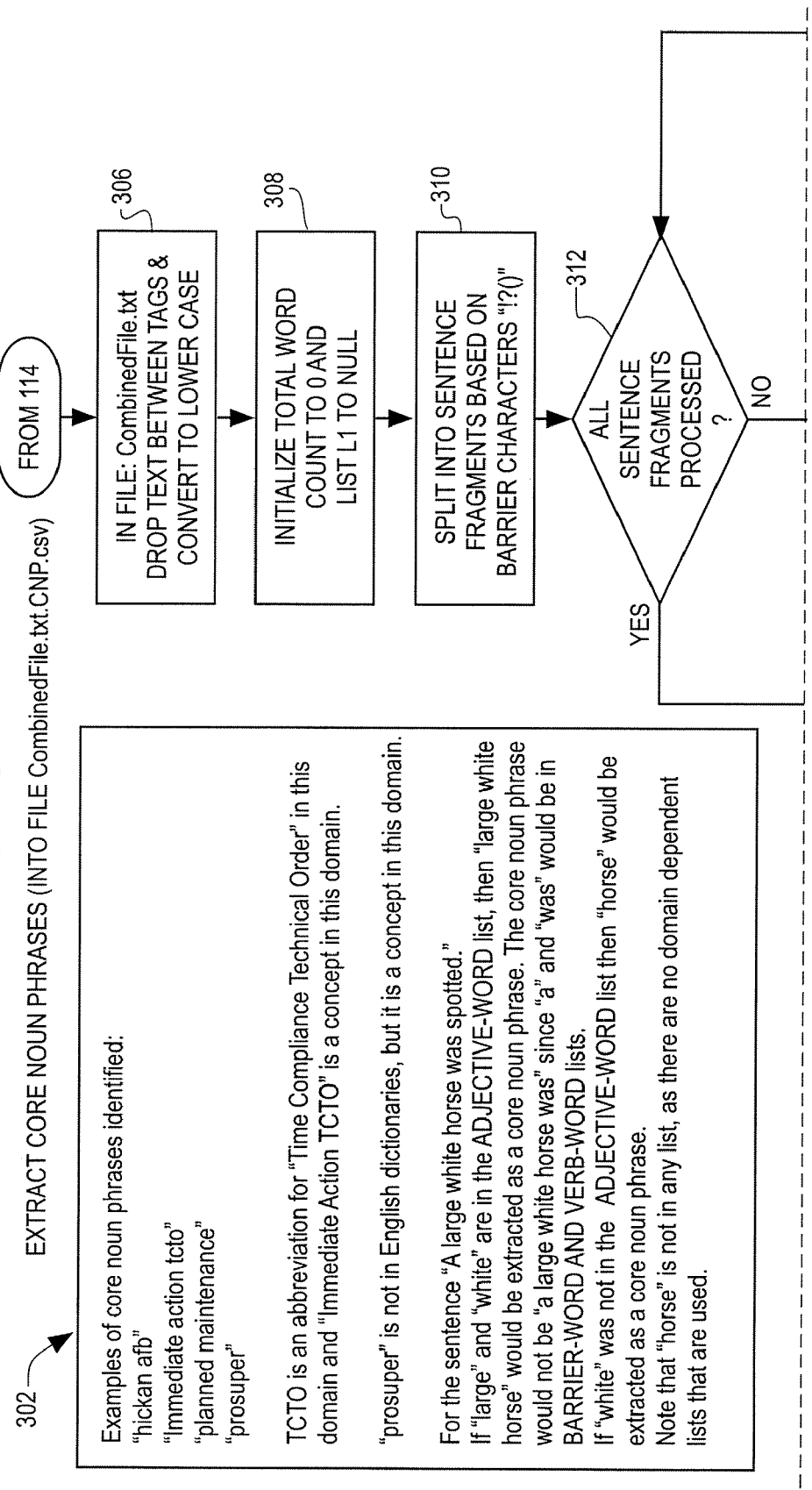

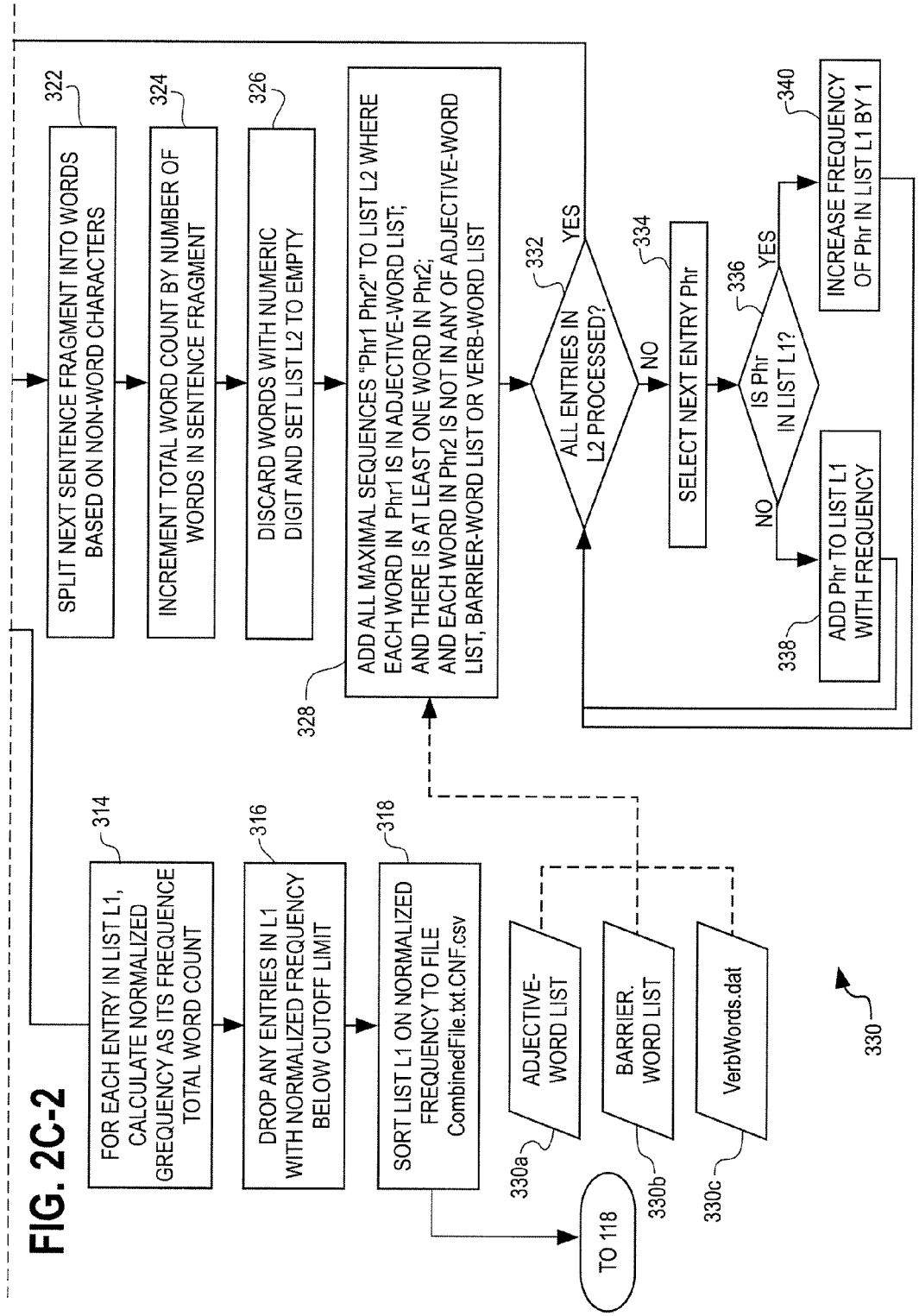

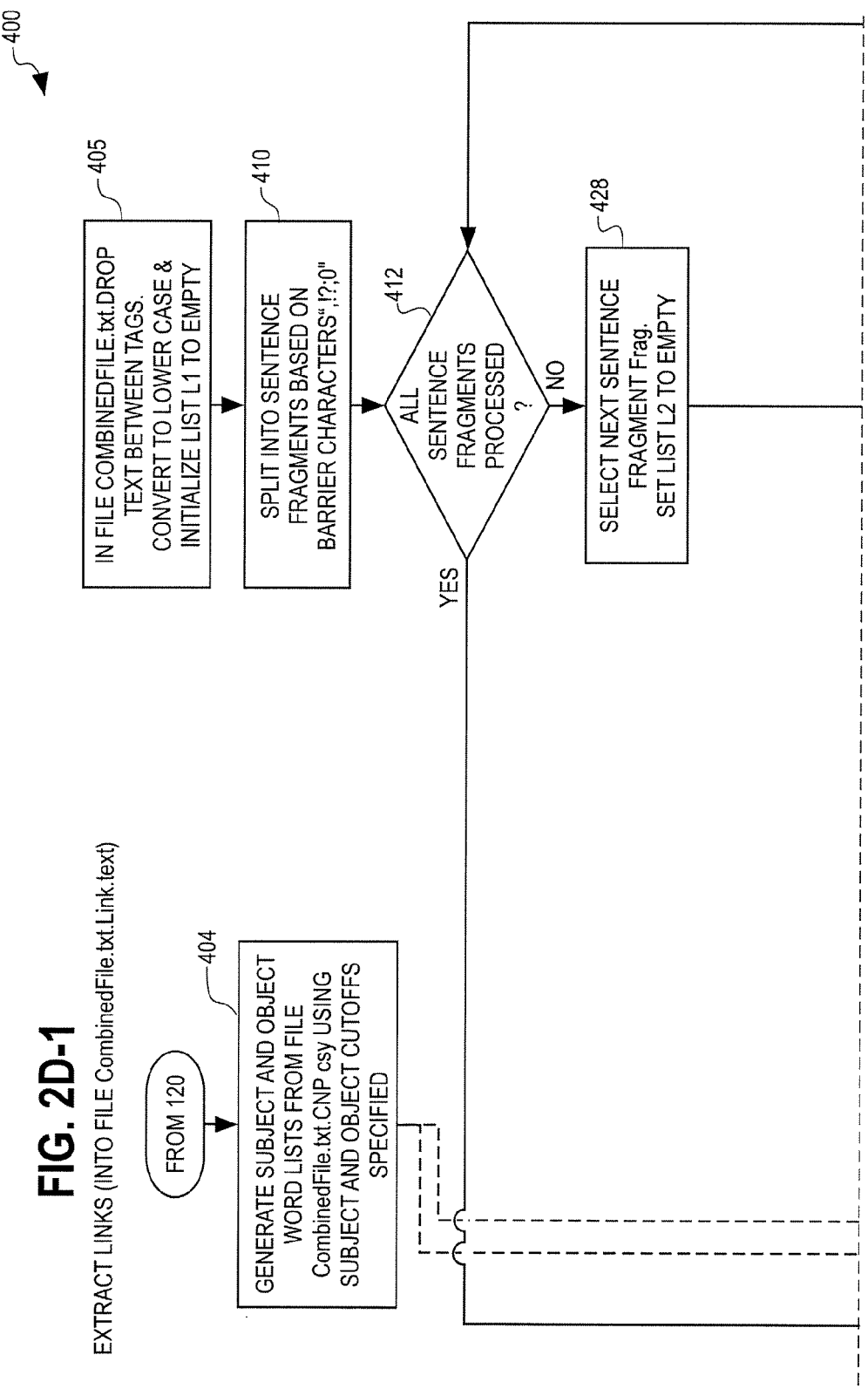

GENERATE INITIAL ONTOLOGY FROM SINGLE-SENSE PHRASES

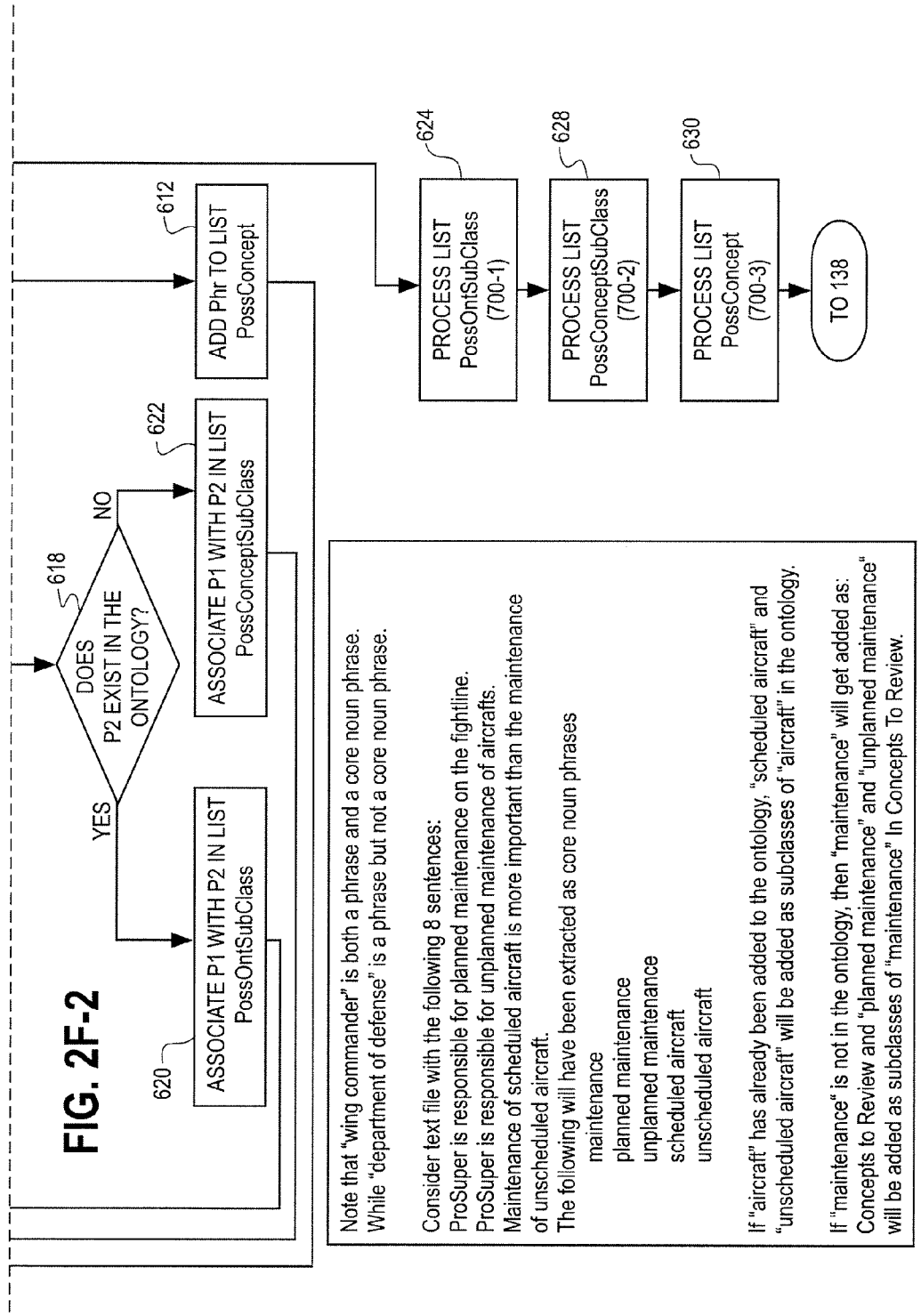

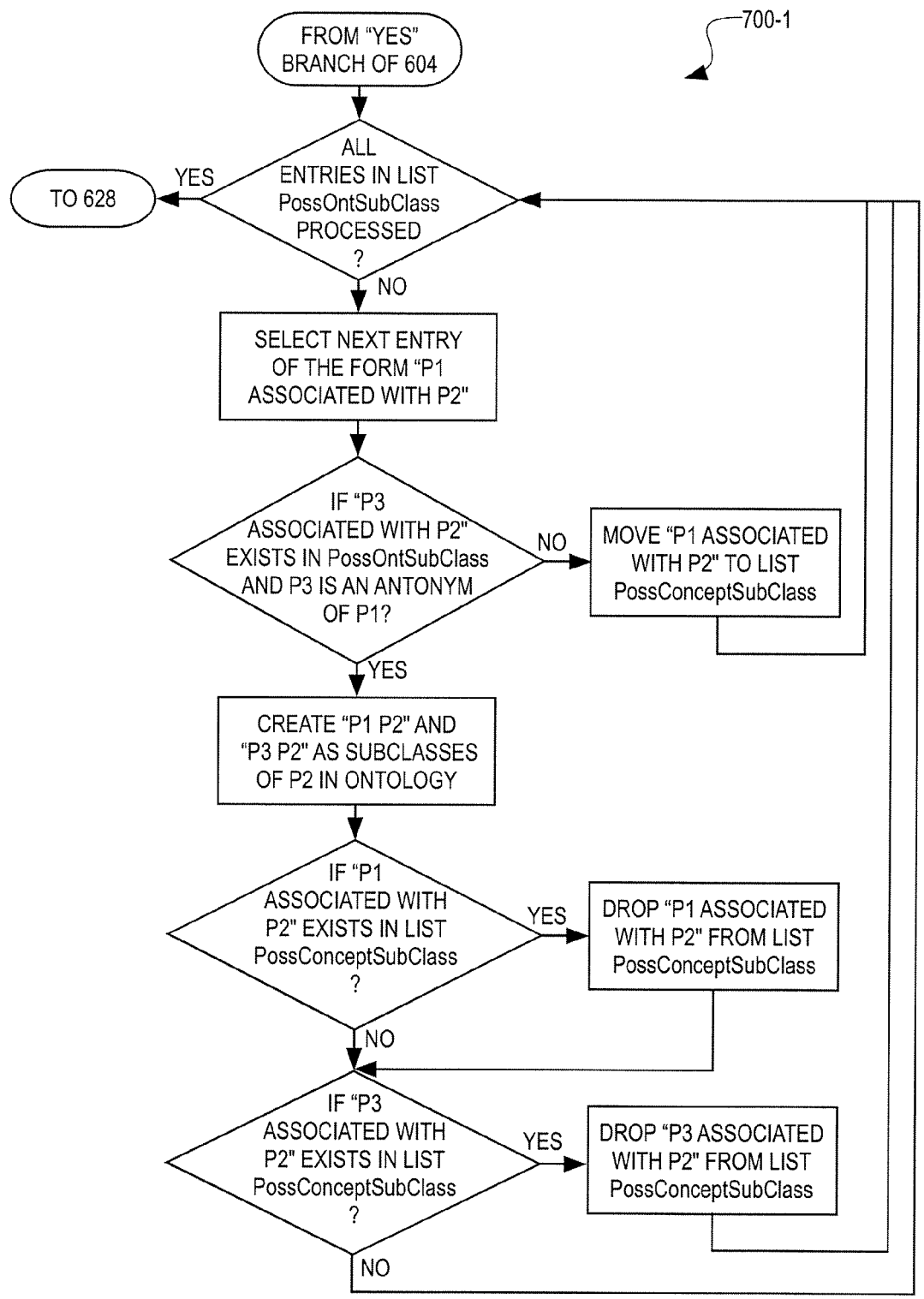

PROCESS LIST PossConceptSubClass

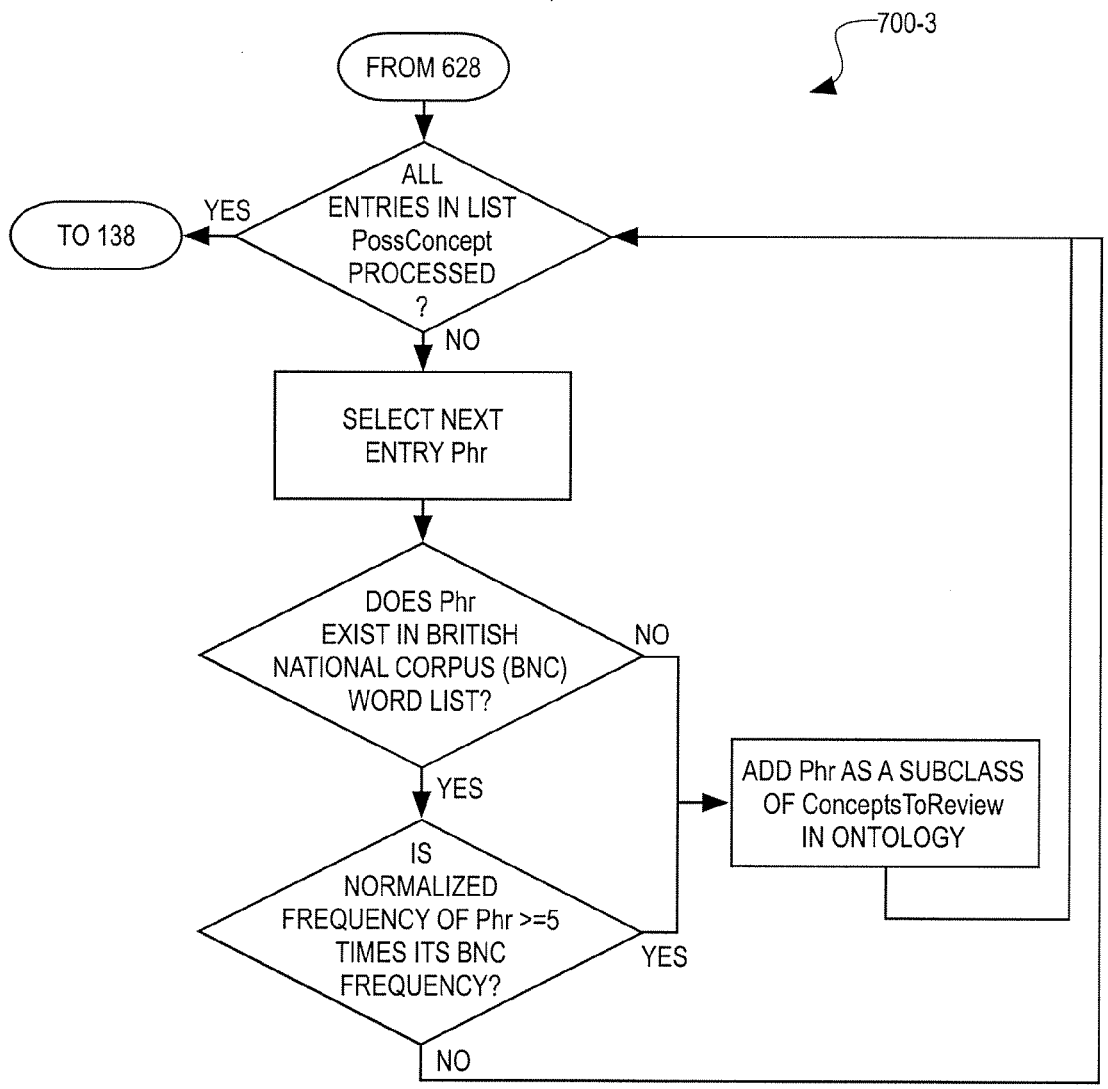

ADD LINK CONCEPTS TO ONTOLOGY

Fig. 3T

SYSTEM AND METHOD FOR AUTOMATING THE GENERATION OF AN ONTOLOGY FROM UNSTRUCTURED DOCUMENTS

FIELD

The invention pertains to systems and methods for creation of ontologies. More particularly, the invention pertains to domain independent systems and methods that can automatically process a corpus of unstructured documents into one or more ontologies.

BACKGROUND

An ontology is a model of the important entities and relationships in a domain. Ontologies have been used in capturing the semantics of a system. Much of the focus in developing semantics and ontologies has been on handcrafting them. That may be appropriate for high level concepts that are domain-independent and which will be used by virtually all domain specific ontologies, but there is a need for a less time-consuming approach to generating domain ontologies, where extensive knowledge is already captured in unstructured texts.

Machine processable domain knowledge has been captured in a variety of formats ranging from expert systems to procedural code to UML models. Regardless of the representation paradigm, the knowledge has in general been hand-coded. On the other hand, large quantities of knowledge have been captured in unstructured texts such as conference proceedings, technical papers, books, and more recently web pages and electronic documents. The latter have generally been written by subject matter, or, domain experts while the former have traditionally required a tight collaboration between domain experts and knowledge engineers or programmers. It has generally been difficult or impossible to obtain the former from the latter by automated, computer-assisted means.

There are a number of ontology extraction tools mentioned in the literature including:
- ASIUM—is a system based on clustering and cooperative methods that is targeted to extracting taxonomic relationships.
- ExtrAKT—extracts ontology information from structured database like Prolog knowledge bases.
- OntoLT—is a Protégé plugin for ontology extraction from annotated text.
- OntoLearn—learns domain concepts and detects taxonomic relationships among them to produce a domain concept forest.
- TextToOnto is part of KAON tool suite. TextToOnto extracts terms that can potentially be included in the ontology as concepts and it also does rule extraction either on the basis of proximity of two terms or by looking for common patterns like "term like term" to identify hierarchy relationships.
- XRA—uses software reverse engineering approach to extract an initial ontology from given data sources and their application programs.
- DOODLE-OWL—is a system for on-the-fly ontology construction. This system relies heavily on user interaction in this construction.

In view of the large quantities of information available in unstructured hard copy texts, web pages and electronic documents, there is a continuing need to be able to extract concepts or relationships from existing, unstructured documents. In view of the existing volumes of unstructured documentation and the rate of increase, domain independent automated methods and systems are preferable. It would also be preferable if required human involvement could be minimized.

BRIEF DESCRIPTION OF THE DRAWINGS

FIGS. 2A-2J are flow diagrams that illustrate processing in accordance with the invention;

DETAILED DESCRIPTION

Figure 1:
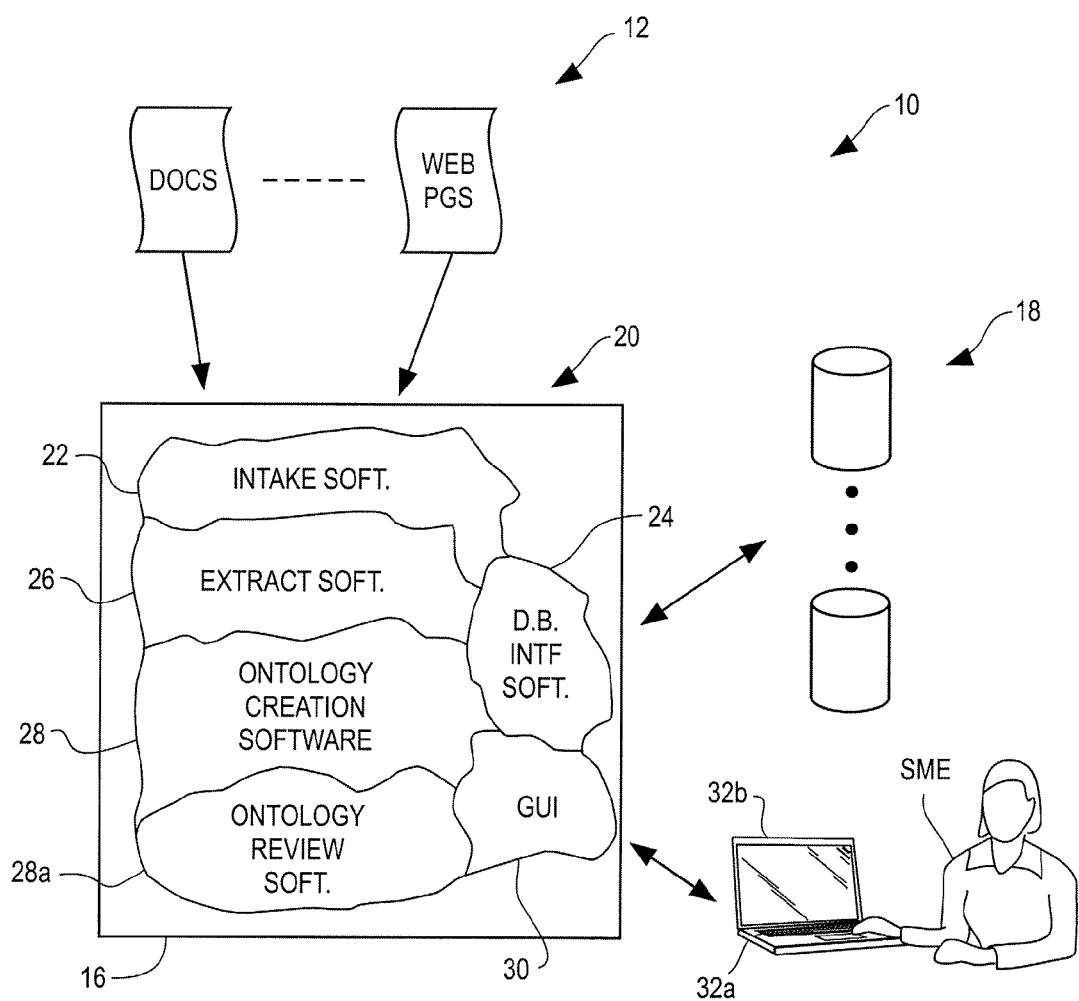
FIG. 1 is a block diagram of a system which embodies the invention.

While embodiments of this invention can take many different forms, specific embodiments thereof are shown in the drawings and will be described herein in detail with the understanding that the present disclosure is to be considered as an exemplification of the principles of the invention, as well as the best mode of practicing same, and is not intended to limit the invention to the specific embodiment illustrated.

A system which embodies the invention can automatically process, identify and extract semantic domain information from technical unstructured documents. Extracted information is structured as an ontology to provide a semantic representation.

The identification and extraction of relevant information is domain independent. Documents which incorporate concepts from a variety of different domains can be structured into different, domain dependent ontologies using common, domain independent, processing in accordance with the present invention.

In one aspect of the invention; phrases of a predetermined maximum length can be extracted from a document. Core noun phrases can then be extracted. The relevant nouns or noun phrases in the document are automatically extracted, independent of the domain of the document. The extracted nouns and noun phrases represent the key concepts in the document.

Links can be extracted into a file. The information extracted from the document can then be structured into an ontology.

In yet another aspect of the invention, phrase concepts can be added to create a new ontology or added to an existing ontology. Core noun phrase concepts can be added followed by link concepts.

Embodiments of the invention make it possible to extract semantic models (ontologies) from a vast repository of unstructured text, which documents much of human knowledge. Drawing on this repository as well as subject matter expertise, the present methodology and system aid in the construction and maintenance of an ontology by the Subject Matter Expert (SME).

In another aspect of the invention, an initial ontology can be generated automatically. Subsequently, the concepts and links that were extracted but not integrated directly into the ontology can be presented to the SME in a drag-and-drop environment so that they can be easily folded into the ontology.

In a disclosed embodiment of the invention, information is automatically extracted from unstructured documents. An initial ontology can be automatically created using non-domain specific processing. A workflow environment can be provided which uses known ontology tools (such as publicly available software, PROTÉGÉ from Stanford Medical Informatics) for visualization, comparison and maintenance.

FIG. 1 illustrates a system 10 in accordance with the invention. Unstructured documents, web pages and the like, all without limitation, generally indicated at 12 are input to and processed by one or more programmable processors 16. Text in various forms can be stored in database(s) 18. Documents 12 can be combined into one file and processed, or, stored in separate files and processed all without limitation.

Processing can be carried out by software recorded on a computer readable medium, having various functions, generally indicated at 20. Representative executable modules include software 22 that acquires input material such as documents, web pages, e-mails and the like all without limitation, in any available form from all available sources. Acquired input material can be stored in database(s) 18 for subsequent processing via database interface software 24.

Acquired input materials can be initially processed by text extraction software 26 as discussed subsequently. Records output by extraction software 26 can then be automatically incorporated into an ontology created and/or maintained by domain independent ontology creation software 28. Structured records can be stored in database(s) 18.

The subject matter expert, SME, can interact with the software 28 and structured records in database(s) 18 via graphical user interface software 30 and keyboard/display devices 32a, b. The SME can resolve issues left open by software 28.

It will be understood that the software modules such as 22-30 can be executed by one or more processors which can communicate via one or more computer networks such as the Internet. The particular hardware/software configuration for a selected implementation is not a limitation of the invention.

FIGS. 2A-2J are flow diagrams that illustrate processing in accordance with the invention. FIGS. 3A-3J are exemplary screens that illustrate various aspects of the processing illustrated in FIGS. 2A-2J.

As those of skill in the art will understand, the processing illustrated in the flow diagrams of FIGS. 2A-2J could be implemented in the system 10 in various embodiments. For example and, without limitation, processor 16 and intake software 22 could be located adjacent to a corpus or plurality of documents to be processed. The intake software 22 could communicate with the extraction software 26 via one or more computer networks. Similarly, the ontology creation software 28 could communicate with the databases 18 also via one or more computer networks. Ontology review software 28a can be used by the SME to review and/or compare ontologies.

FIG. 2A illustrates a domain independent method of processing 100 in accordance with the invention. A user logs in, step 102, via a logon screen, FIGS. 3A and 3B. In a step 104 a user selects a function to either create a new session or select an existing session as illustrated in the screen of FIG. 3C. A user elects whether to extract concepts from text documents, add concepts to an ontology or review and compare ontologies as illustrated in the screen of FIG. 3D.

In a step 106 the user has elected to extract concepts from text documents. In step 108 the user has selected an input text directory, as illustrated on the screen of FIG. 3E, and has selected a text file a portion of which is displayed on the right half of the screen of FIG. 3E.

Subsequently, in step 110 on the screen of FIG. 3E, the user also sets phrase concept cutoff percentages and phrase length parameters. The cutoff percentage specifies a degree of frequency required to keep a phrase in a sorted list. Also in the screen of FIG. 3E the user can elect to extract phrase concepts from the selected text file, illustrated in step 112. The phrase extraction process is illustrated in more detail in the flow diagram of FIG. 2B.

Figures 1, 2B:
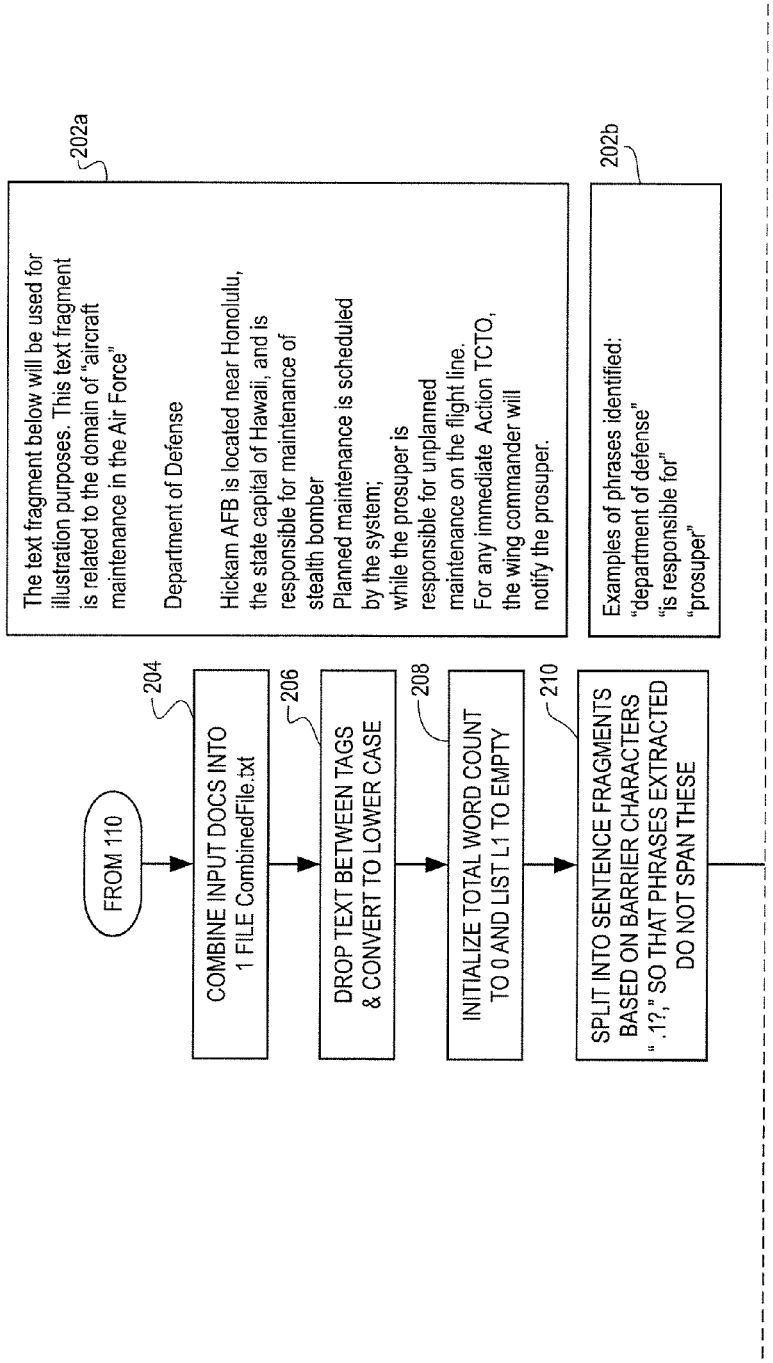
Figures 2, 2B:
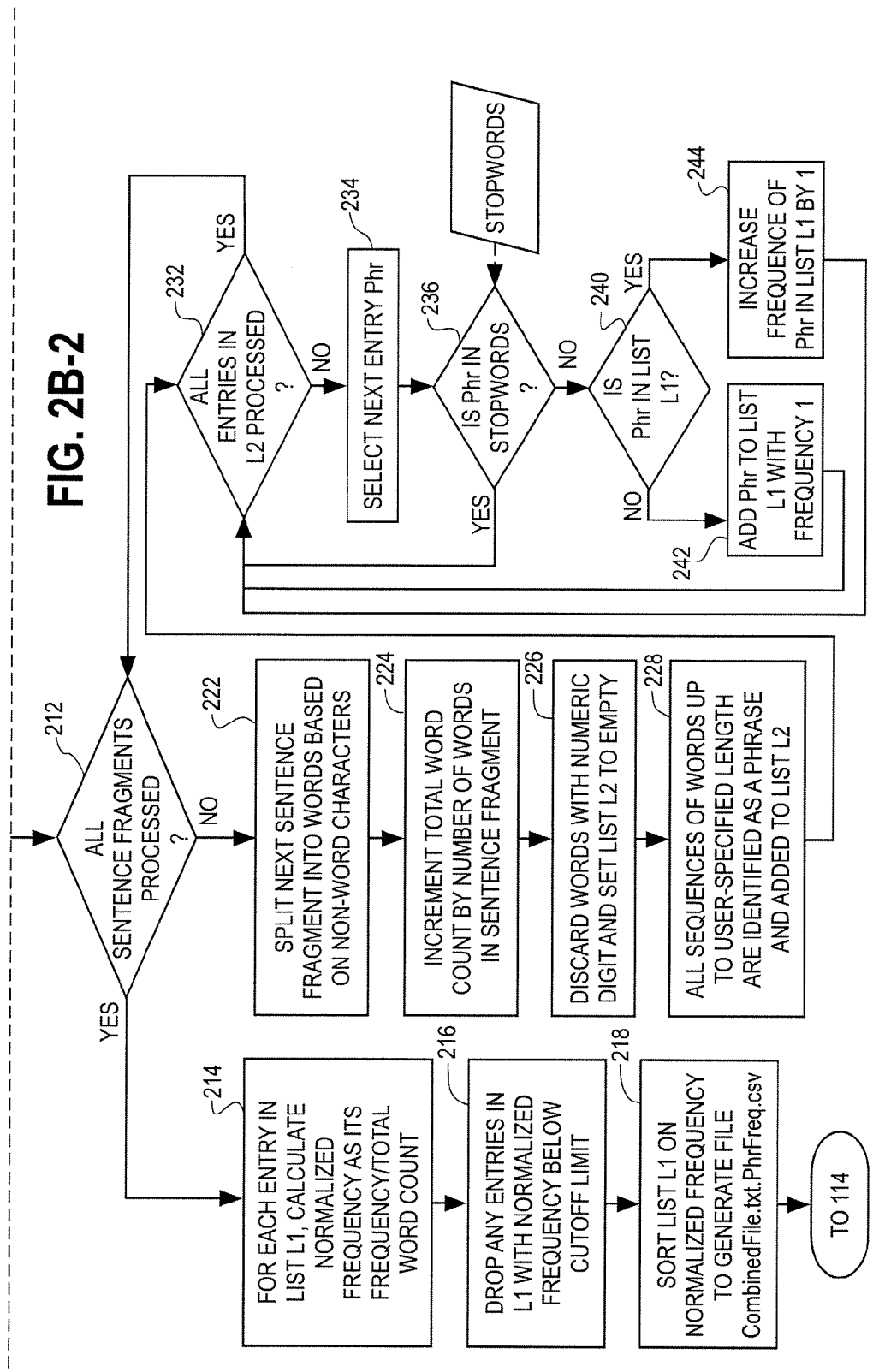
Figure 3A:
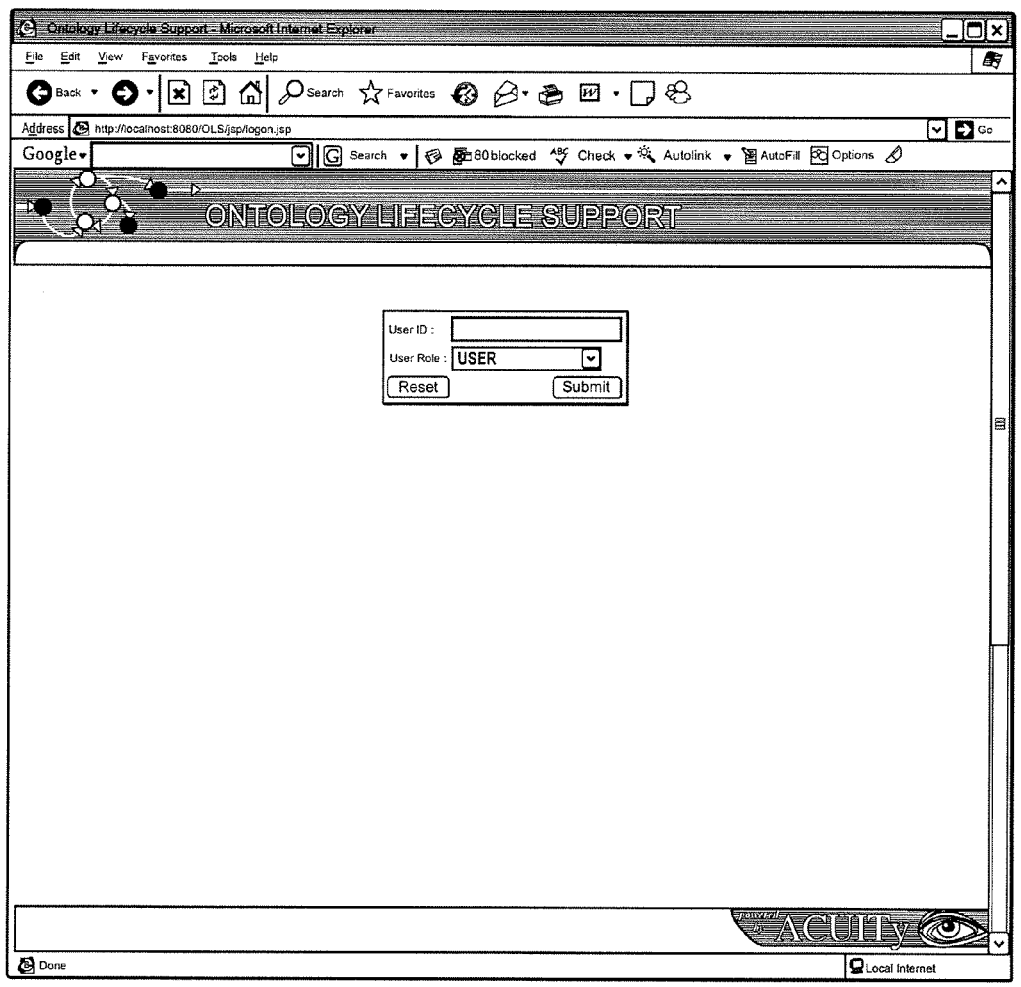
FIGS. 3A-3U are exemplary screens that illustrate aspects of the processing of FIGS. 2A-2J.
Figure 3B:
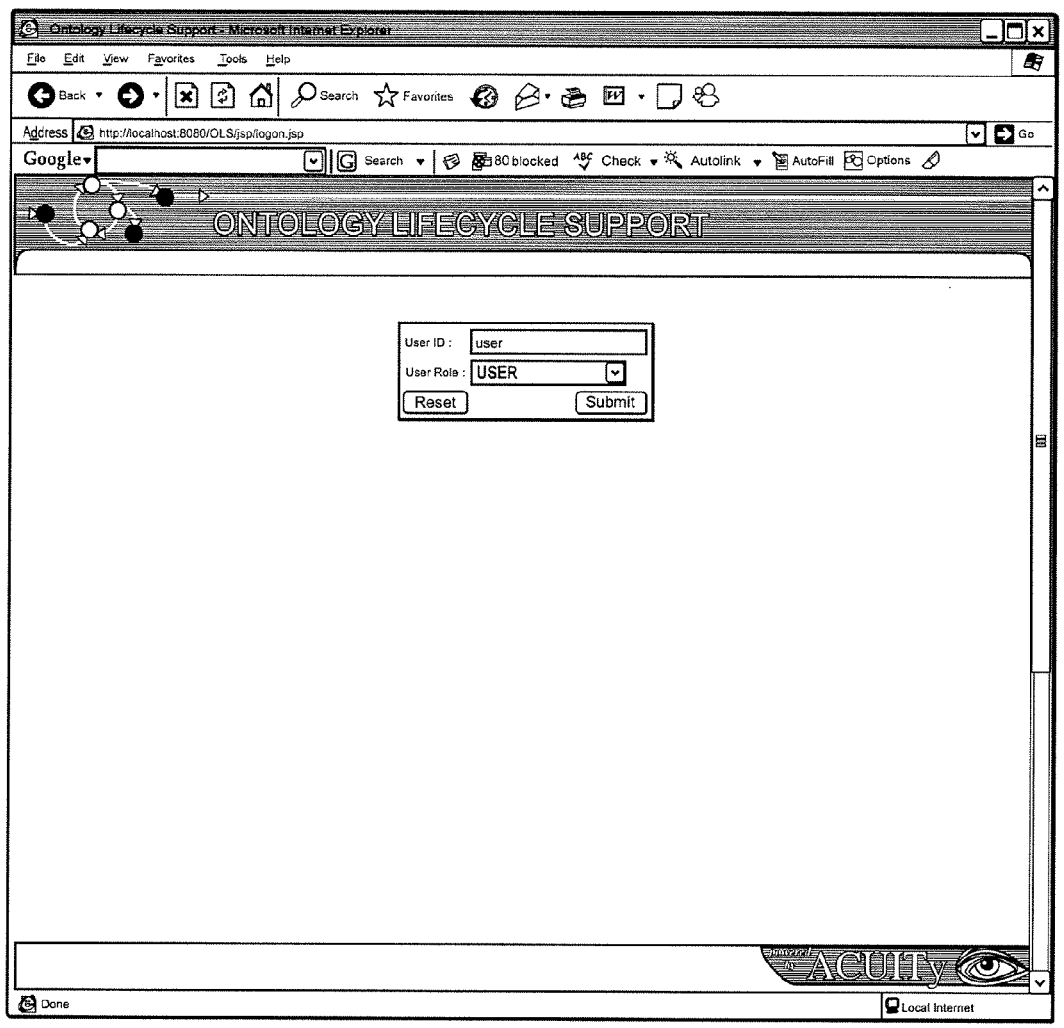
Figure 3C:
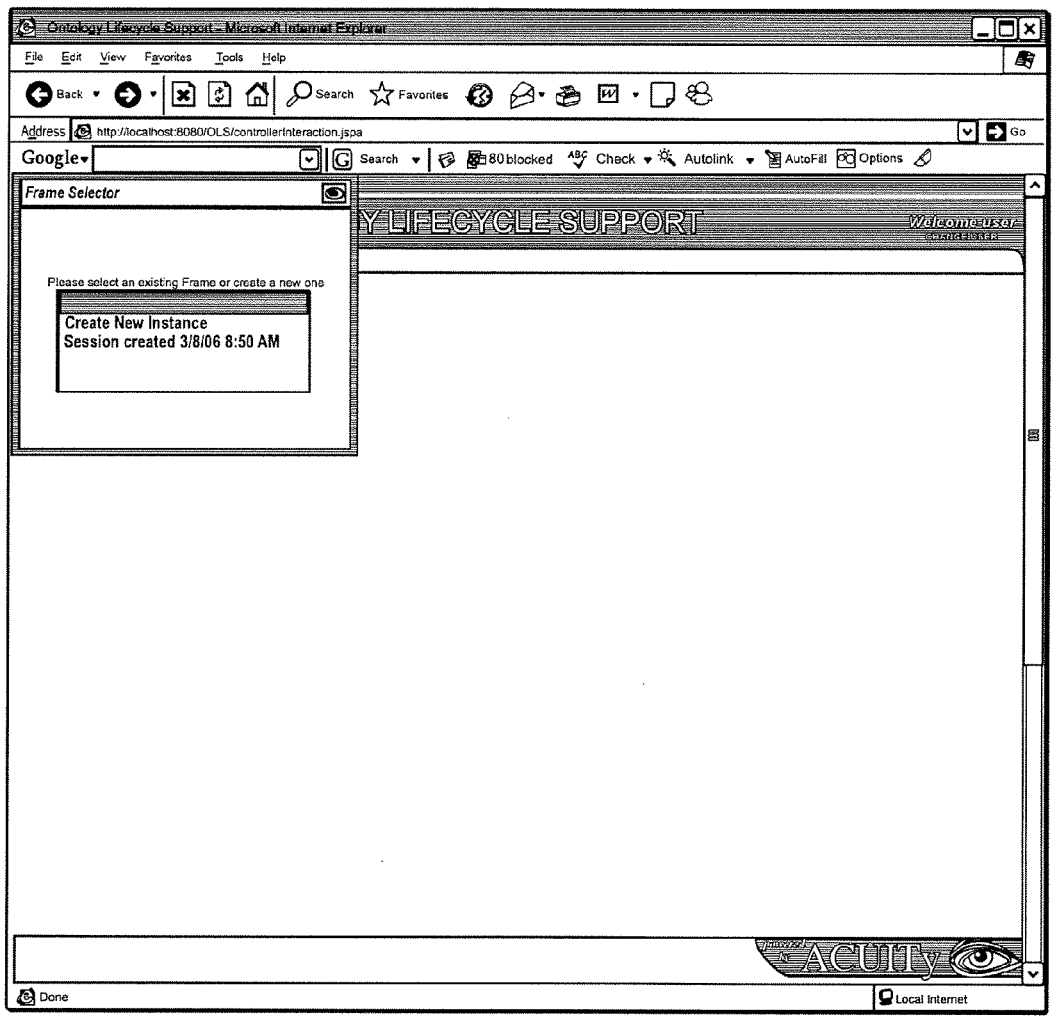
Figure 3D:
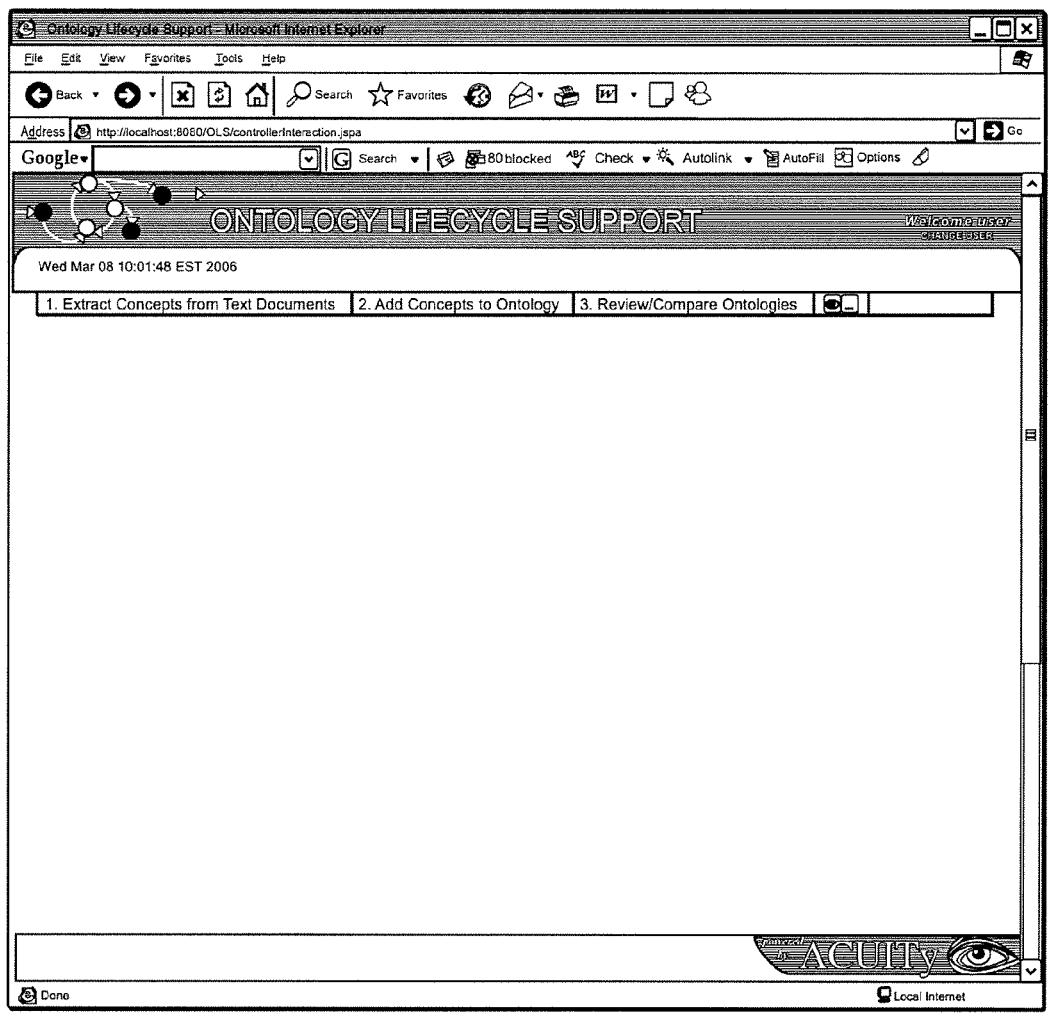
Figure 3E:
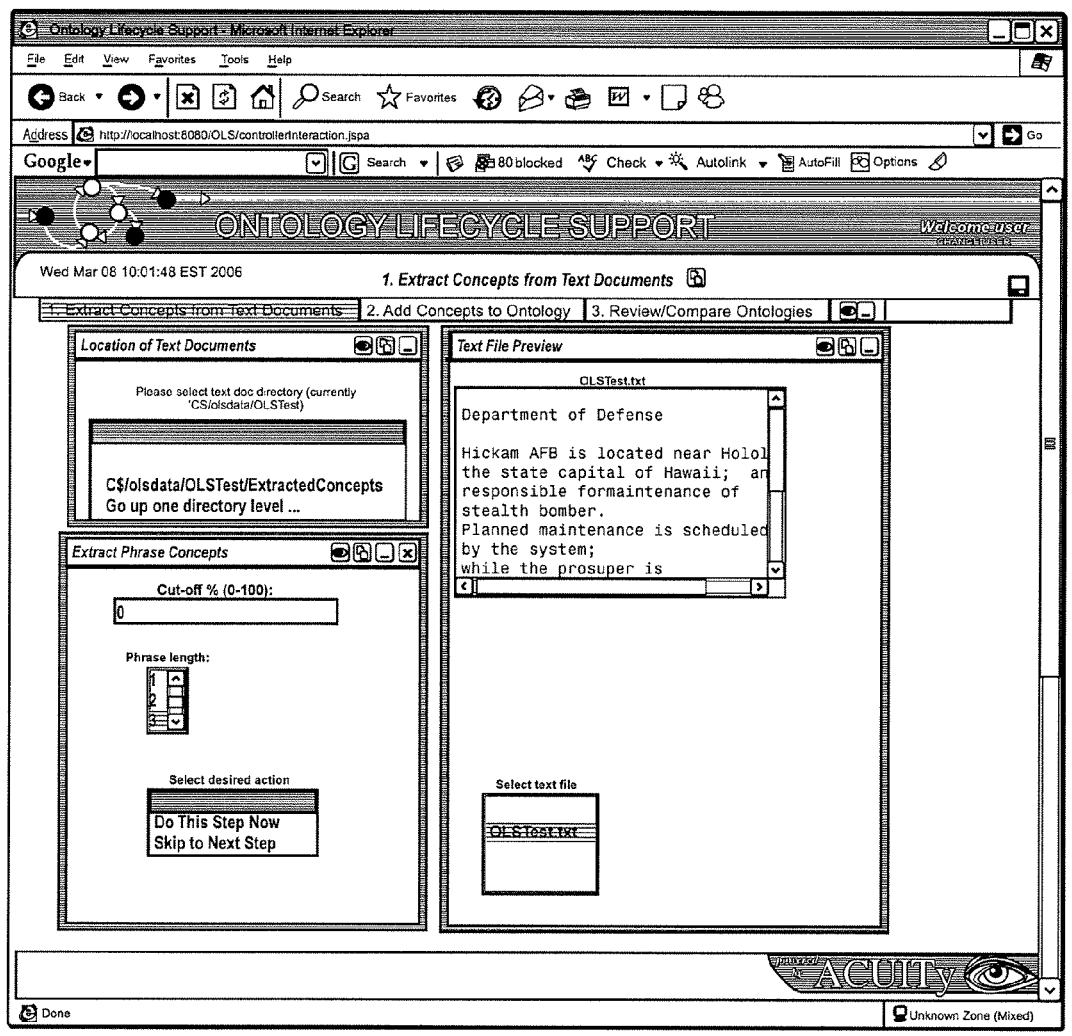
Figure 3F:
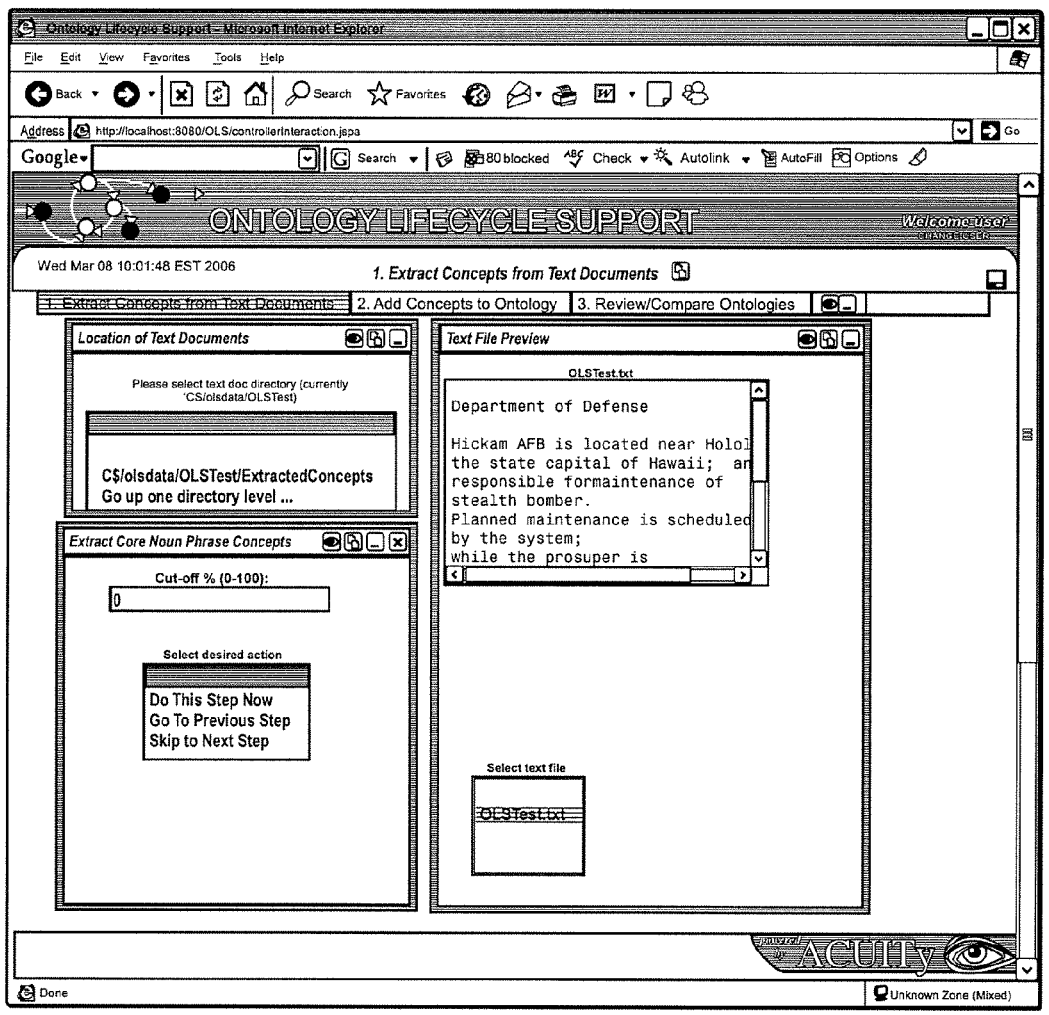

Subsequent to extracting the phrases from the selected documents, the user can, in step 114, using the screen of FIG. 3F set a percentage cutoff for core noun phrases. The selected percentage cutoff establishes a degree of frequency required to keep the respective core noun phrases in a sorted list. Those that fail to exhibit the selected degree of frequency are discarded. The process of extracting core noun phrases can then be selected in the screen of FIG. 3F step 116. Additional details of the process of extracting core noun phrases are illustrated in the flow diagram of FIG. 2C.

The goal of the process of extracting core noun phrases, step 116 is to identify textual elements that incorporate any number of adjectives, including zero, followed by nouns. Processing is implemented by use of files or lists of words, such as adjective words, barrier words and verb words. The barrier words and verbs are words that are not likely to be part of a core noun phrase. The adjective words are words that are usually used as adjectives.

The list of barrier words includes those words which force a separation of phrases. The adjective words list includes those words which primarily appear as adjectives. A word in this list may appear only as an adjective. A list of stop words can be provided. These are words which are to be ignored.

Figures 2, 2D:
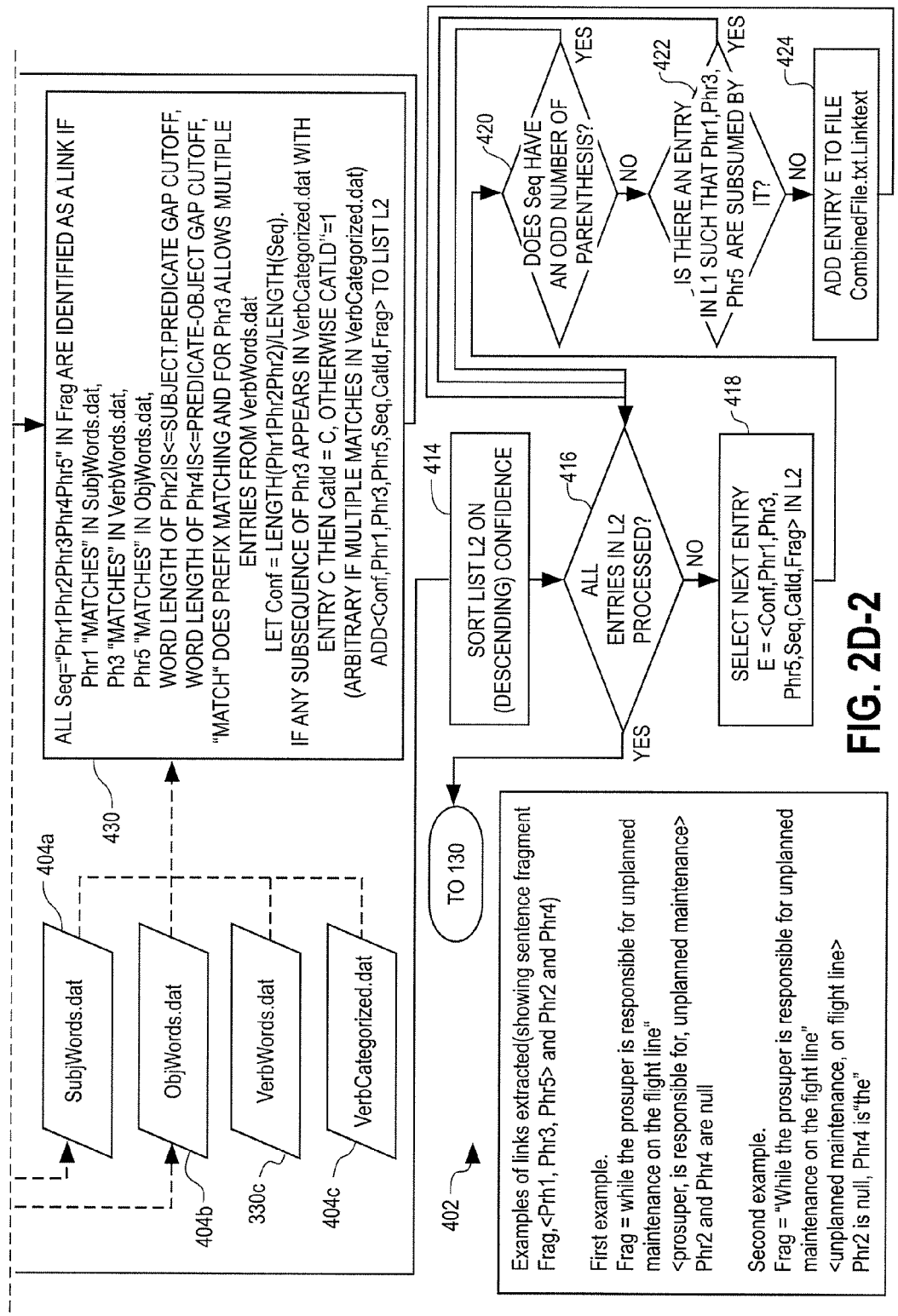
Figure 3G:
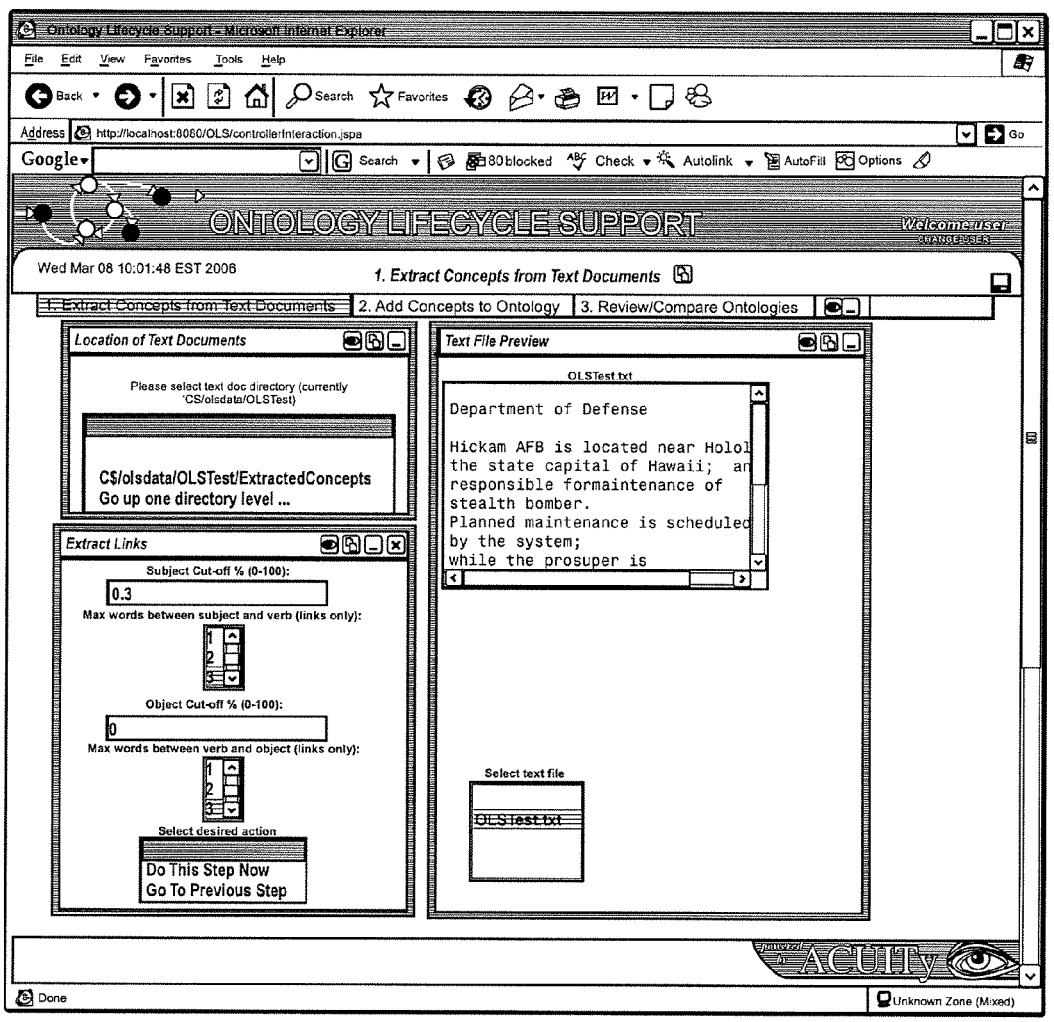

Link extraction is initiated in step 118. As illustrated in the screen of FIG. 3G a user can establish cutoff percentages for subjects, and objects. Additionally in step 120 gaps, maximum words between subject and predicate, can be set by the user as well as maximum words between the predicate and an associated object. The user using the screen of FIG. 3G can initiate the link extraction process, step 122. Details of the link extraction process are illustrated in FIG. 2D.

The goal of the link extraction process is to extract relationships and links of the form "subject-predicate-object". These three components are driven by word lists where the subject and object words are generated from the input documents to be processed. Each extraction has a confidence level associated with it. A publicly available lexical database like WordNet organizes English words into sets of synonyms called synsets and WordNet is utilized in generating these word lists.

Completion of the extract links processing, step 122, results in a file with an unstructured "flat" representation of the important concepts and relationships from the document. In step 116, the processing to extract core noun phrases can be expected to load all information which is extracted from the document into the respective file.

Subsequent steps relate to establishing or expanding an ontology, steps 130-138, to provide a structured representation of the information extracted from the document. Subsequently, in steps 140-148 various ontologies can be reviewed or compared.

Figure 3H:
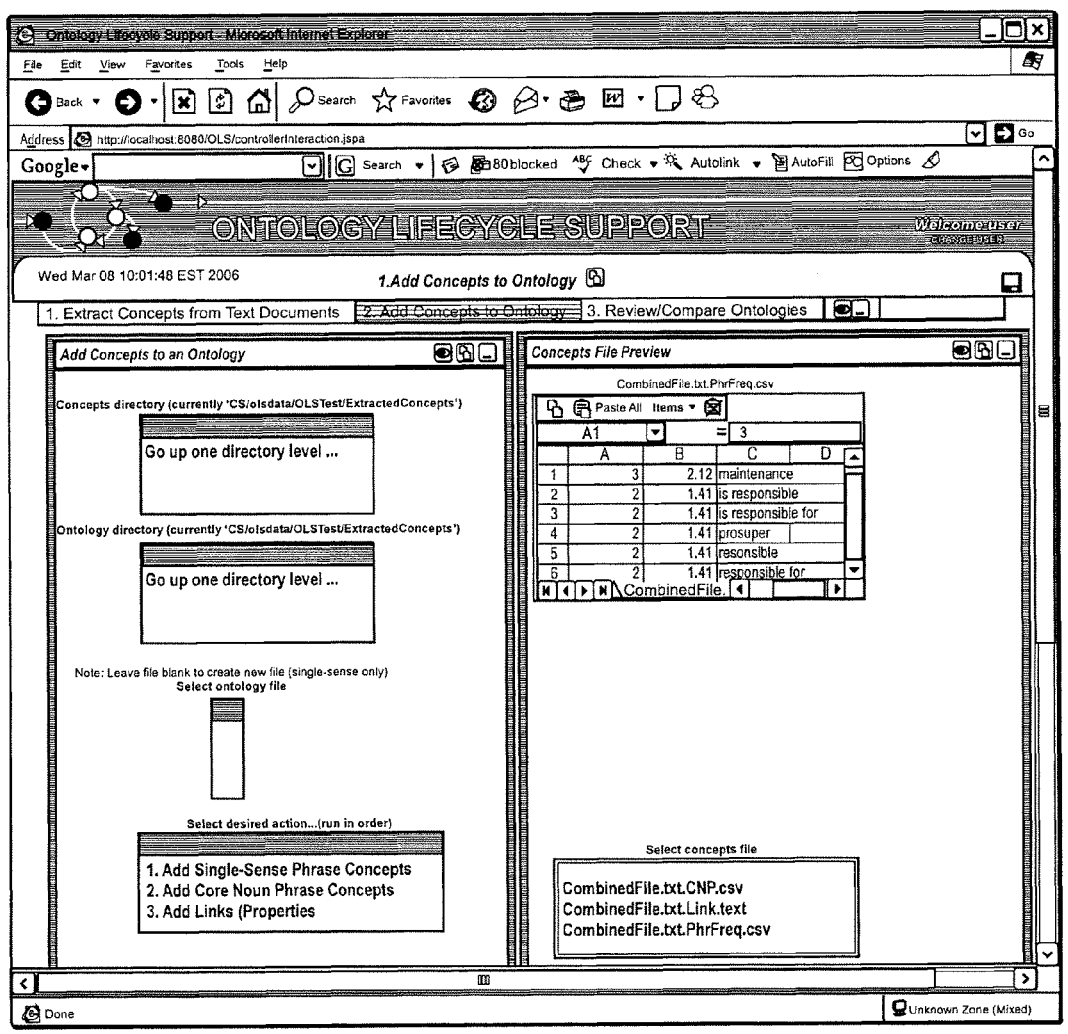

In step 130 a user can select a tab to add previously extracted concepts to an ontology. The screen of FIG. 3H illustrates both a concepts directory and an ontology directory which can be selected by the user, step 132. Additionally, the user can select as a desired action adding single-sense phrase concepts, core noun phrase, concepts or links.

The display of FIG. 3H illustrates contents of the phrase file, the phrases extracted in step 112. In the upper right of the display of FIG. 3H three columns are presented. These are frequency, normalized frequency and the phrase. Phrases are sorted by frequency.

Figures 1, 2E:
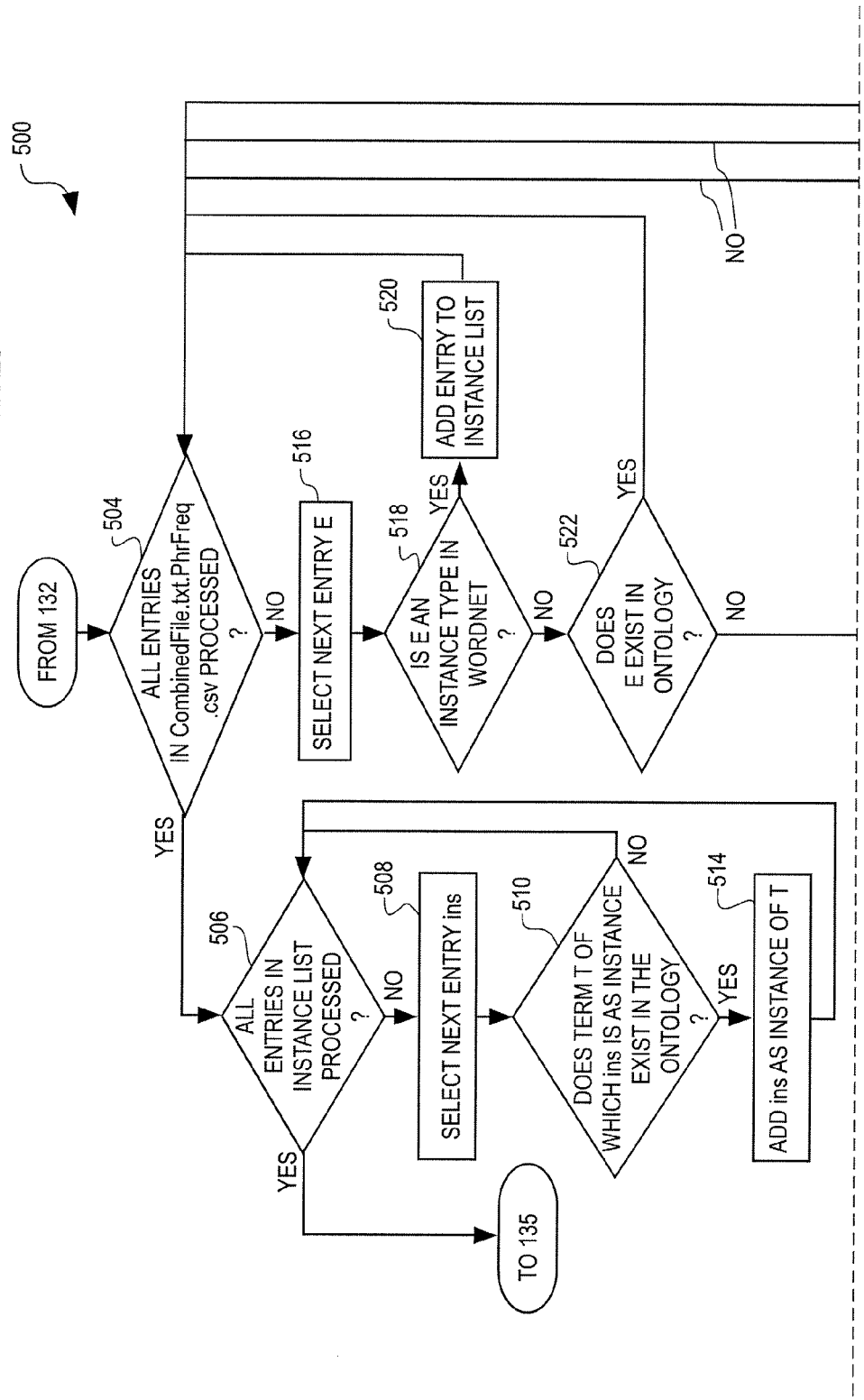
Figures 2, 2E:
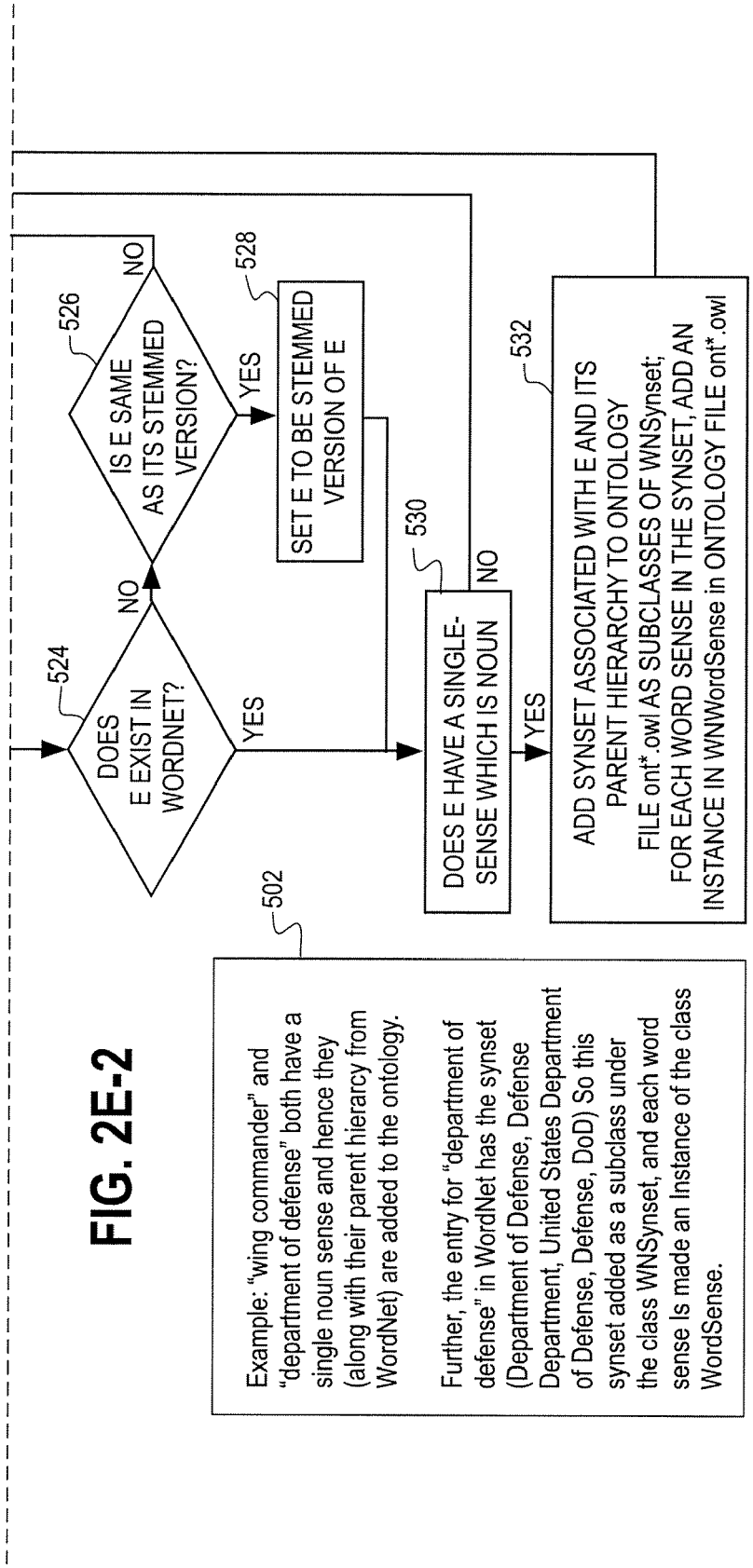

The phrases illustrated on the display of FIG. 3H are those which were extracted in step 112 from the document illustrated on FIG. 3E. In step 134 a new ontology can be created by selecting as the desired action, step one namely, adding single-sense phrase concepts. Additional processing details of step 134 are illustrated in the block diagram of FIG. 2E.

Figure 3I:
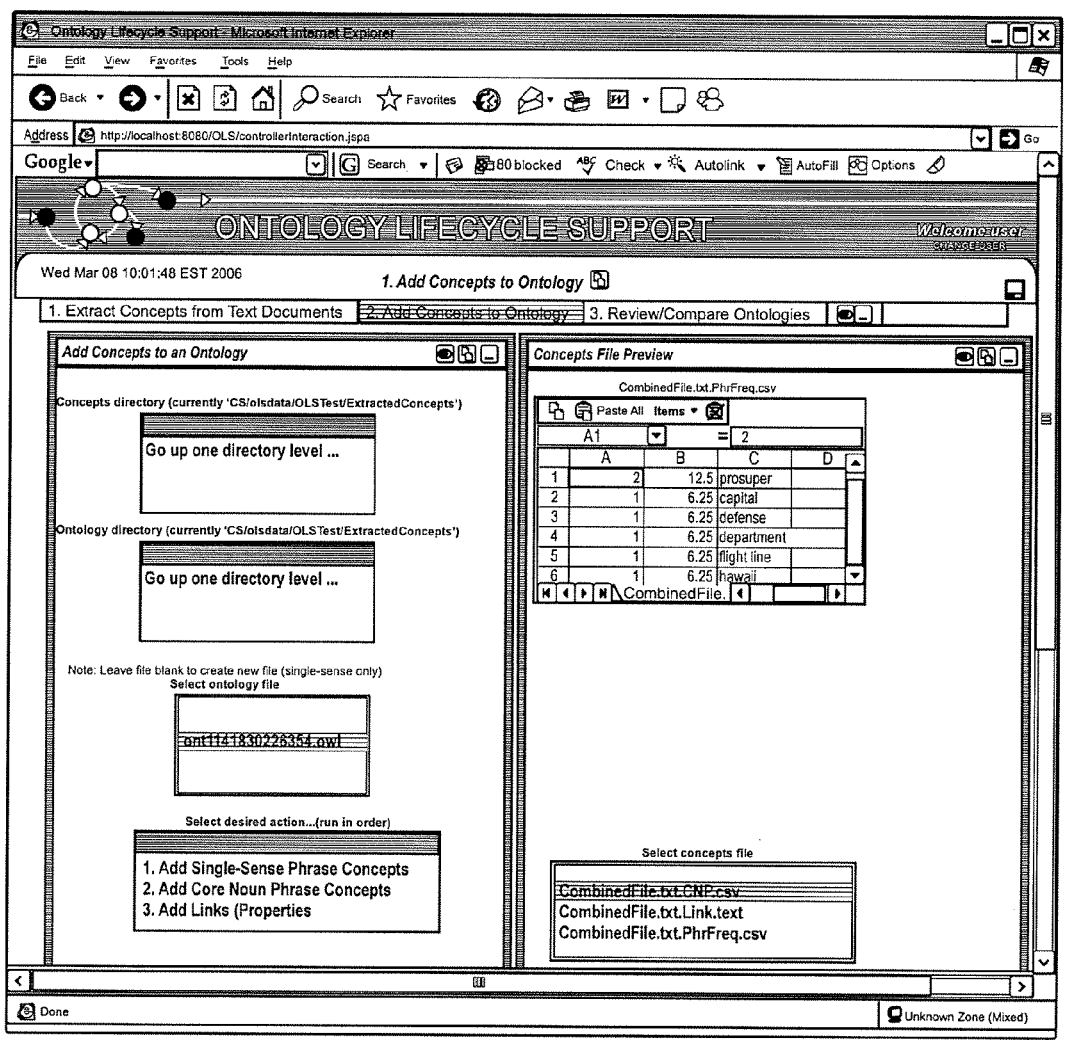

Subsequent to creating a new ontology, step 134 the user can add core noun phrases to that ontology in step 136. The display of FIG. 3I illustrates on the upper right therein the core noun phrases file created in step 116. The core noun phrases have been extracted from the document illustrated in FIG. 3E. The user specifies the core noun phrase file via selecting the appropriate entry in the lower right portion of that display.

The core noun phrases file illustrated in the upper right of FIG. 3I once again has three columns, frequency, normalized frequency and the core noun phrase. The phrases are sorted by frequency of occurrence.

Figure 3J:
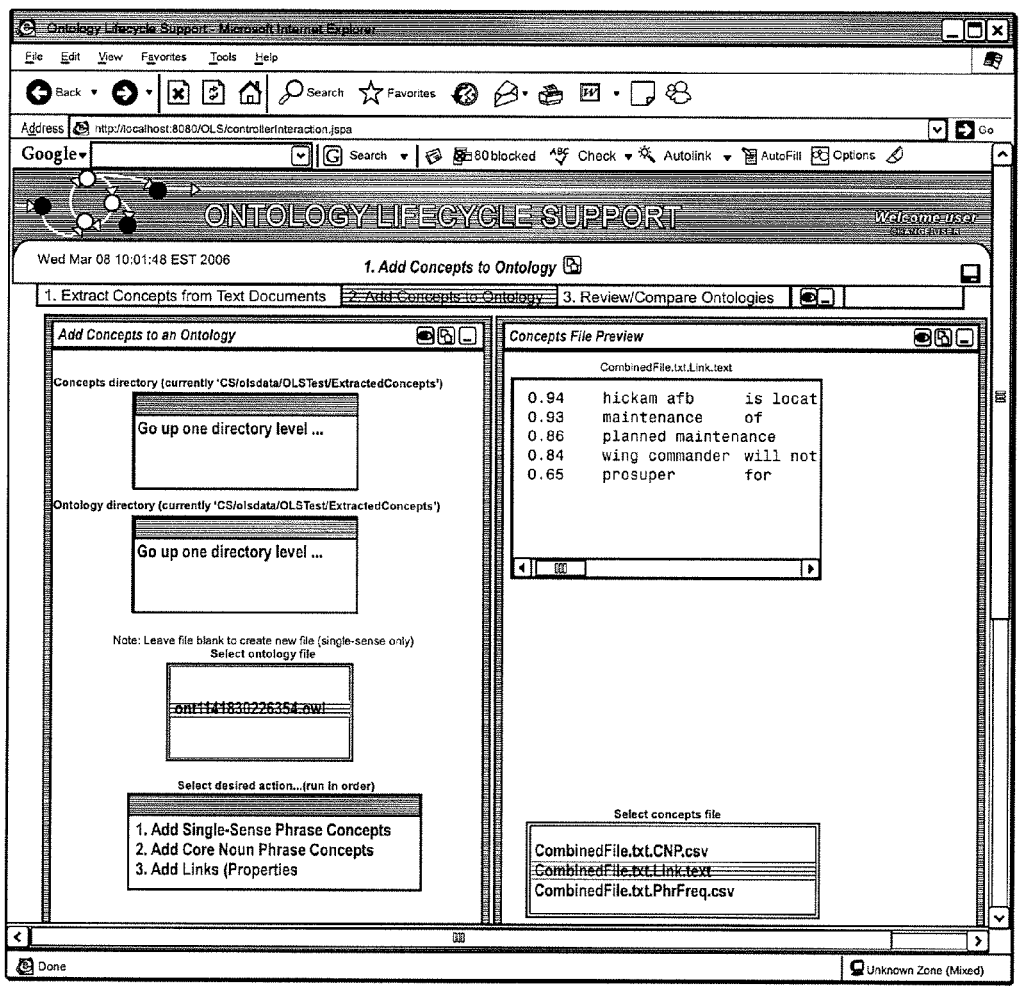

The link concepts from the file previously created in step 122 can then be added to the ontology, step 138. The display of FIG. 3J illustrates in the upper right a portion of the link text file from step 122. The illustrated portions of the file are the confidence column and "subject" sorted by confidence value. Additional details of the processing of step 138 are illustrated in the flow diagram of FIG. 2J.

Figure 3K:
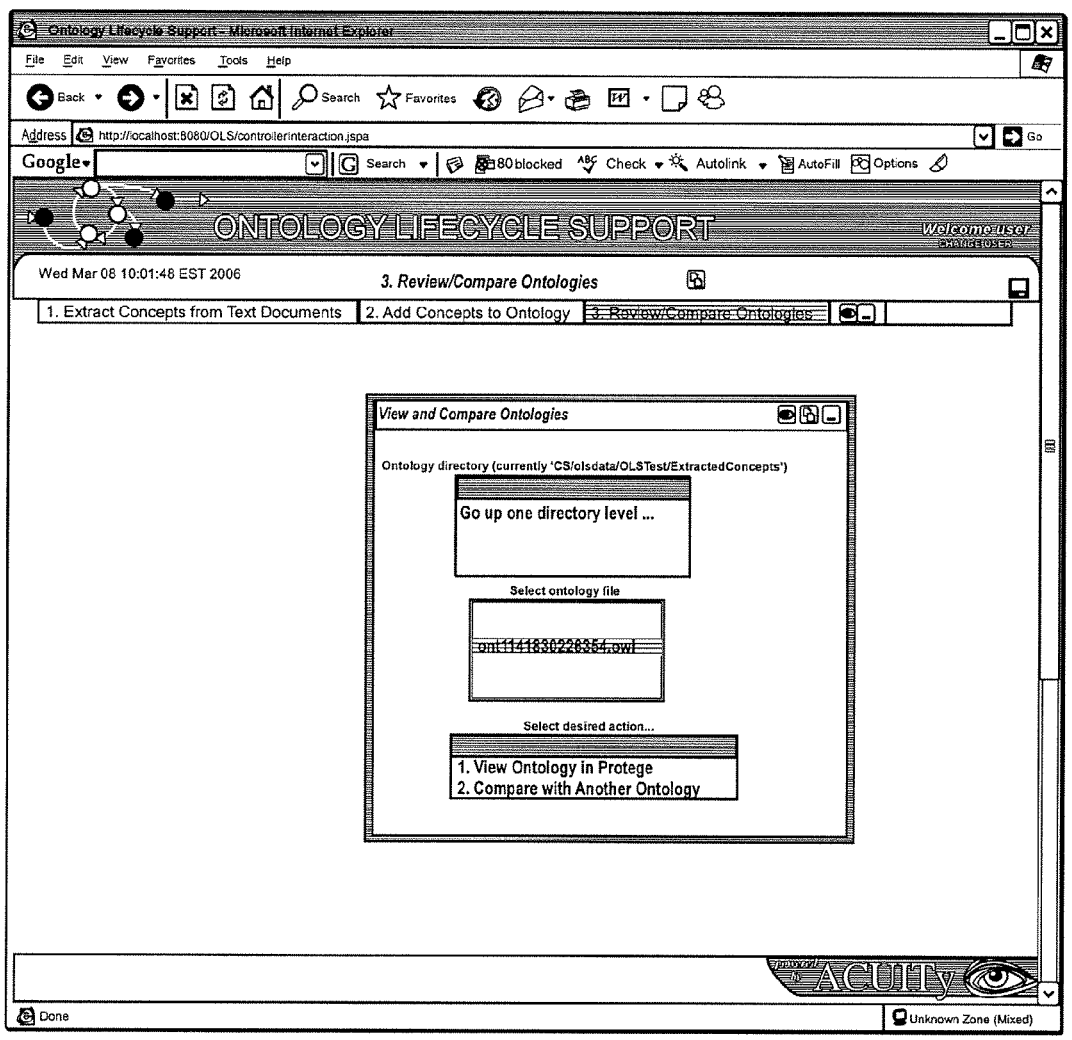

In step 140 a user can elect to review and compare ontologies, as illustrated in the screen of FIG. 3K. When so elected, the user in step 142 can select an ontology directory and file along with specifying whether an ontology is to be viewed or compared with another ontology.

Figure 3L:
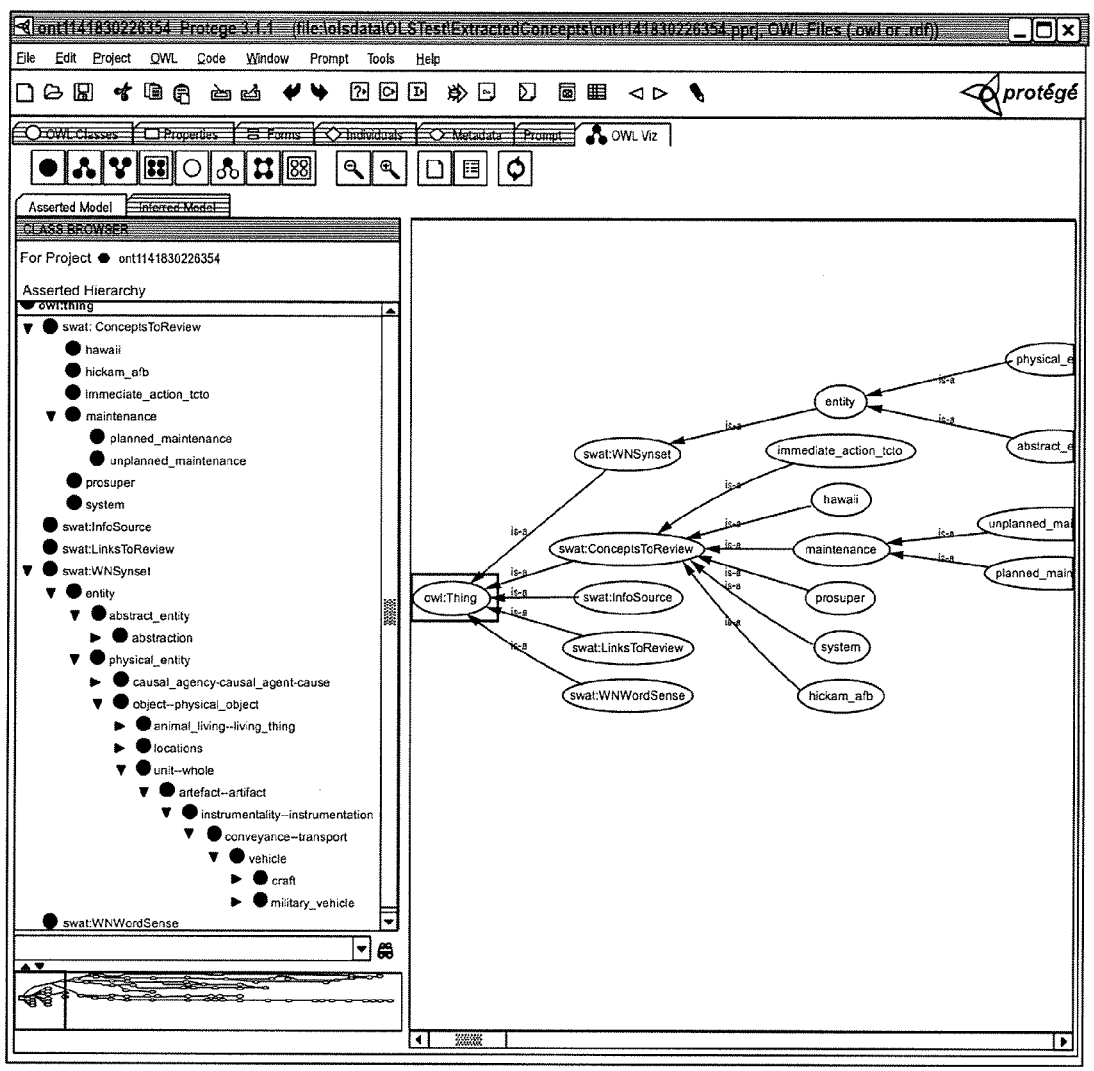
Figure 3M:
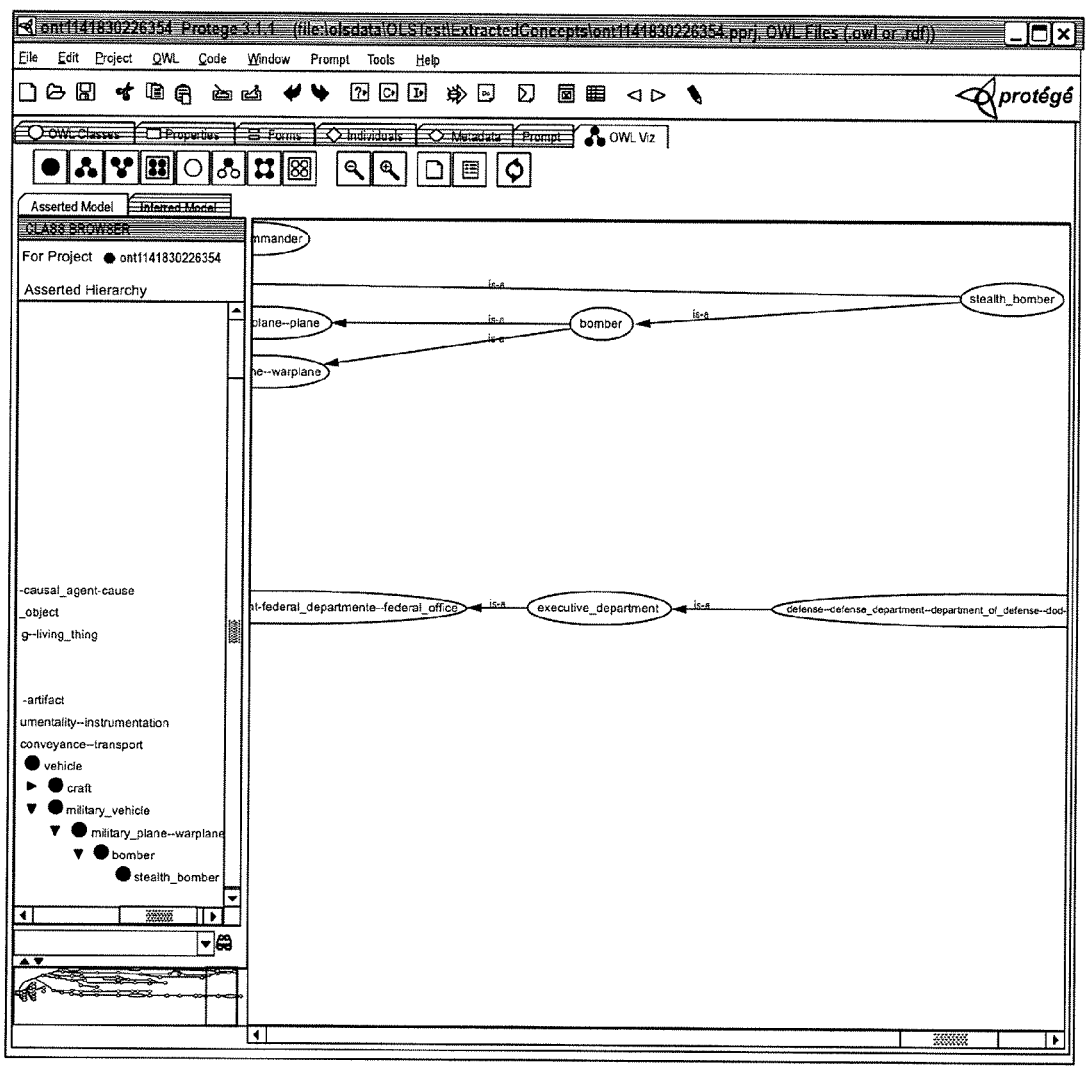
Figure 3N:
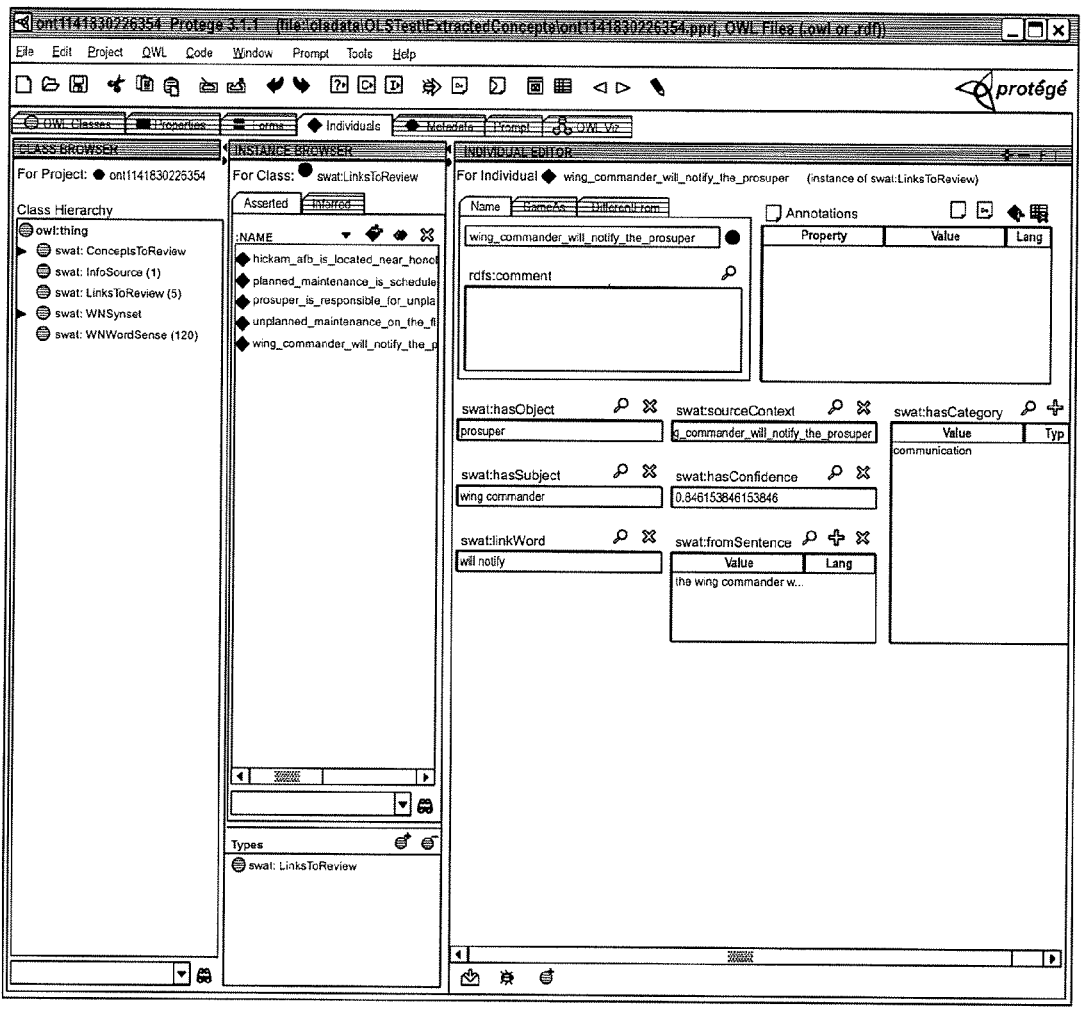
Figure 3O:
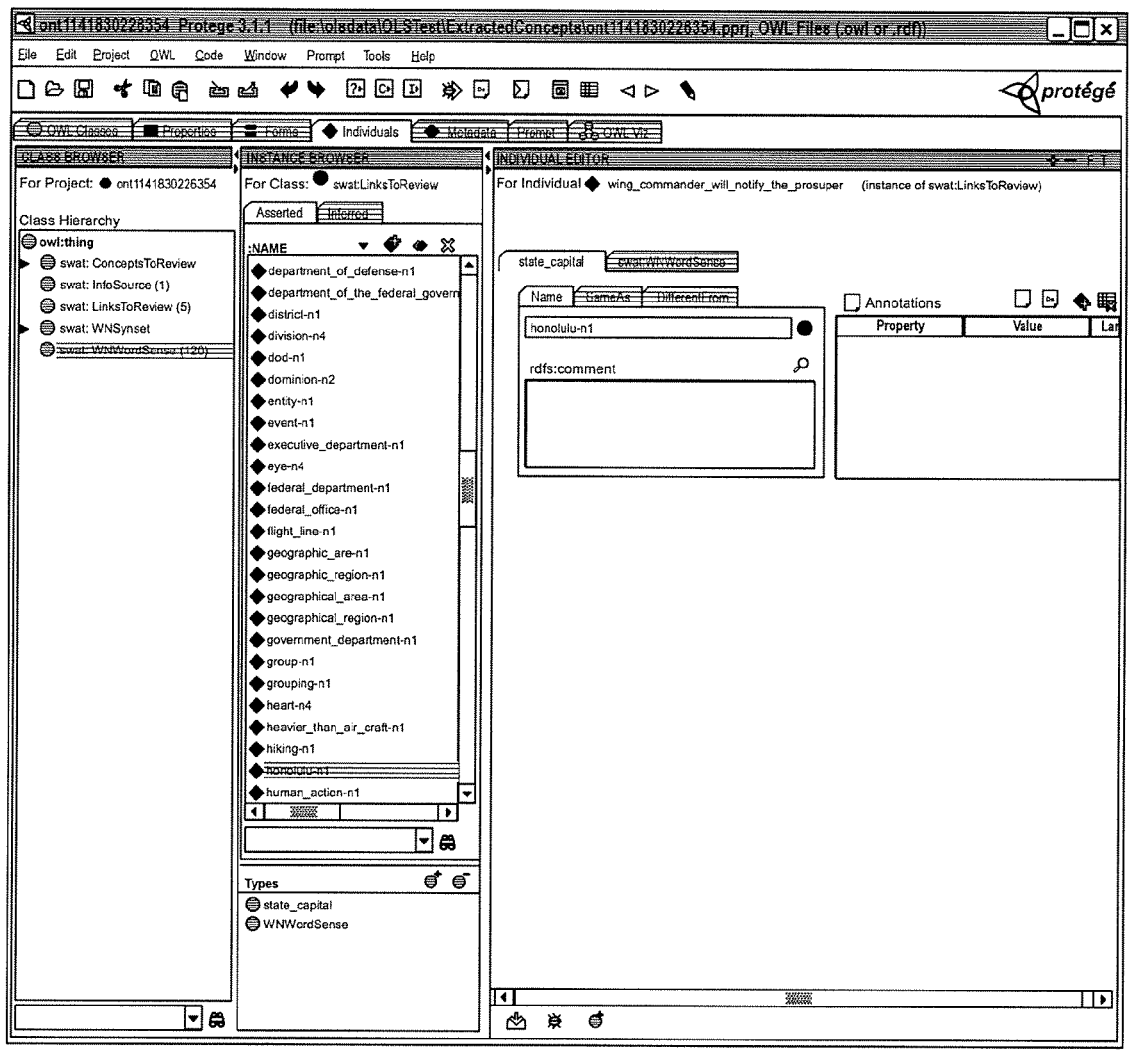

In step 144, as illustrated in the screens of FIGS. 3L, 3M user can view a graphical representation of an ontology, which includes a previously created ontology based on an unstructured document. Additionally, the user can, as illustrated in the screen of FIG. 3N, view extracted links in the ontology. Finally, in the screen of FIG. 3O the user can view captured instance data.

Figure 3P:
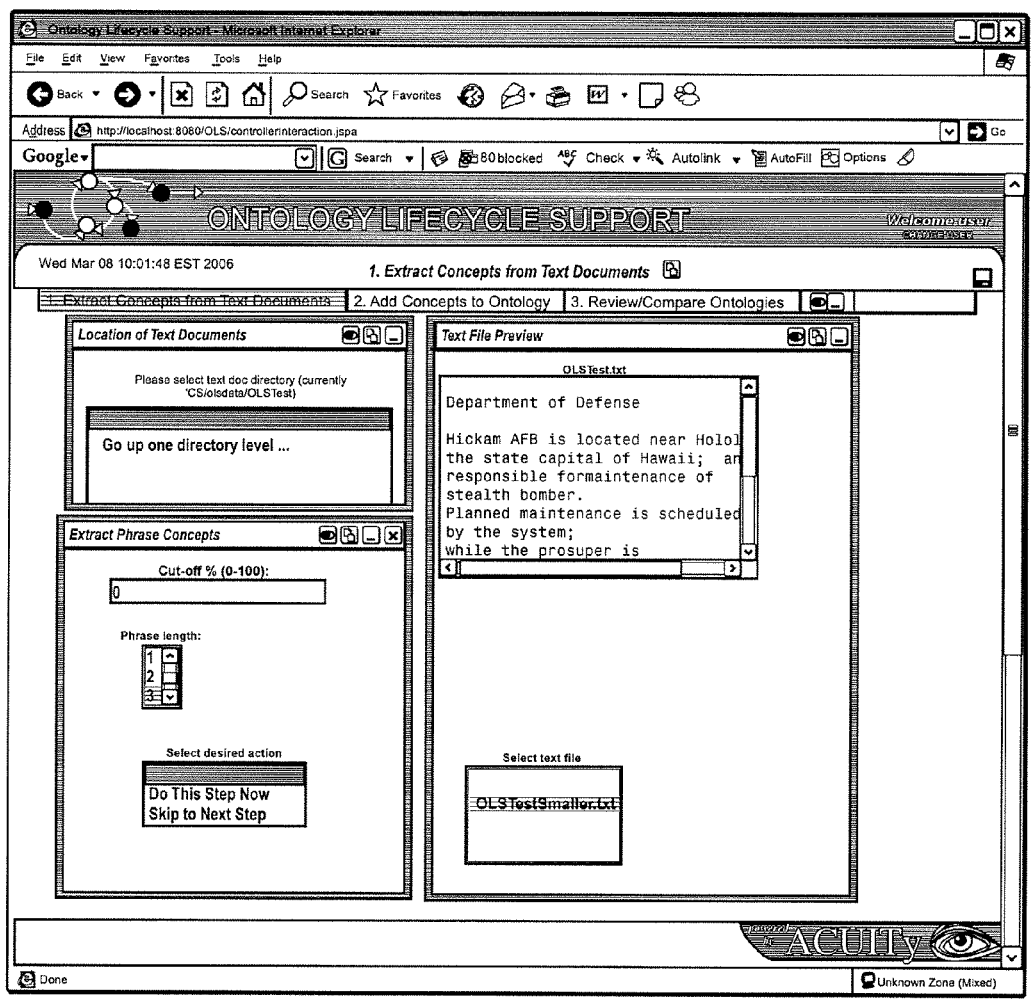
Figure 3Q:
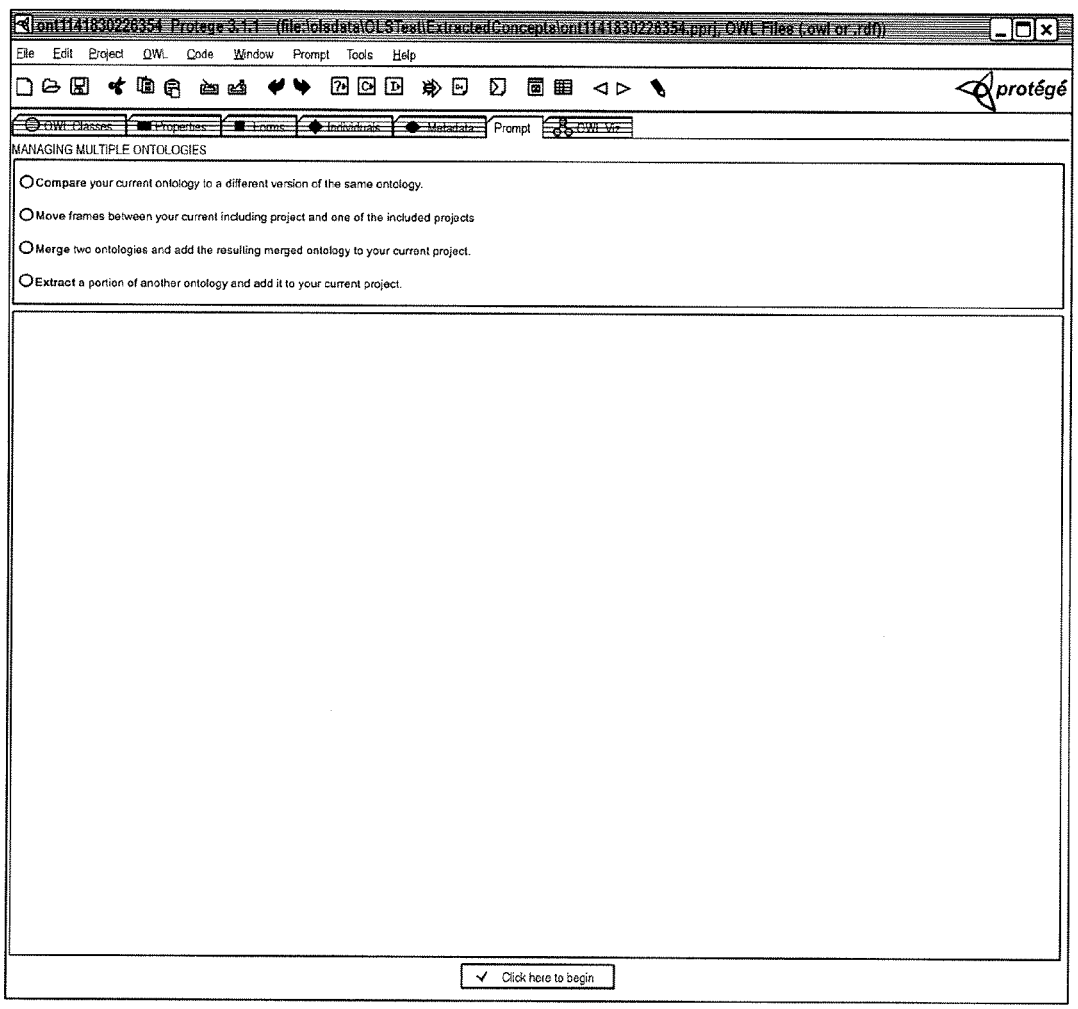
Figure 3R:
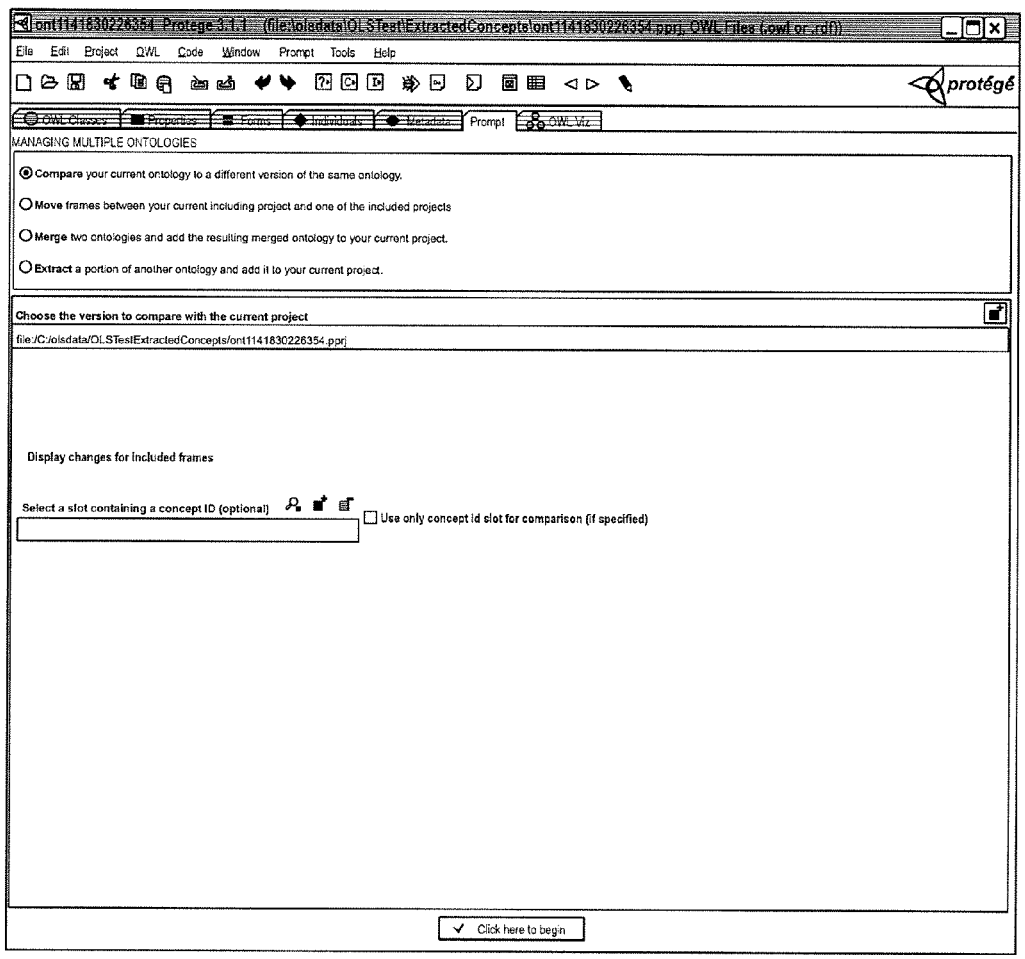
Figure 3S:
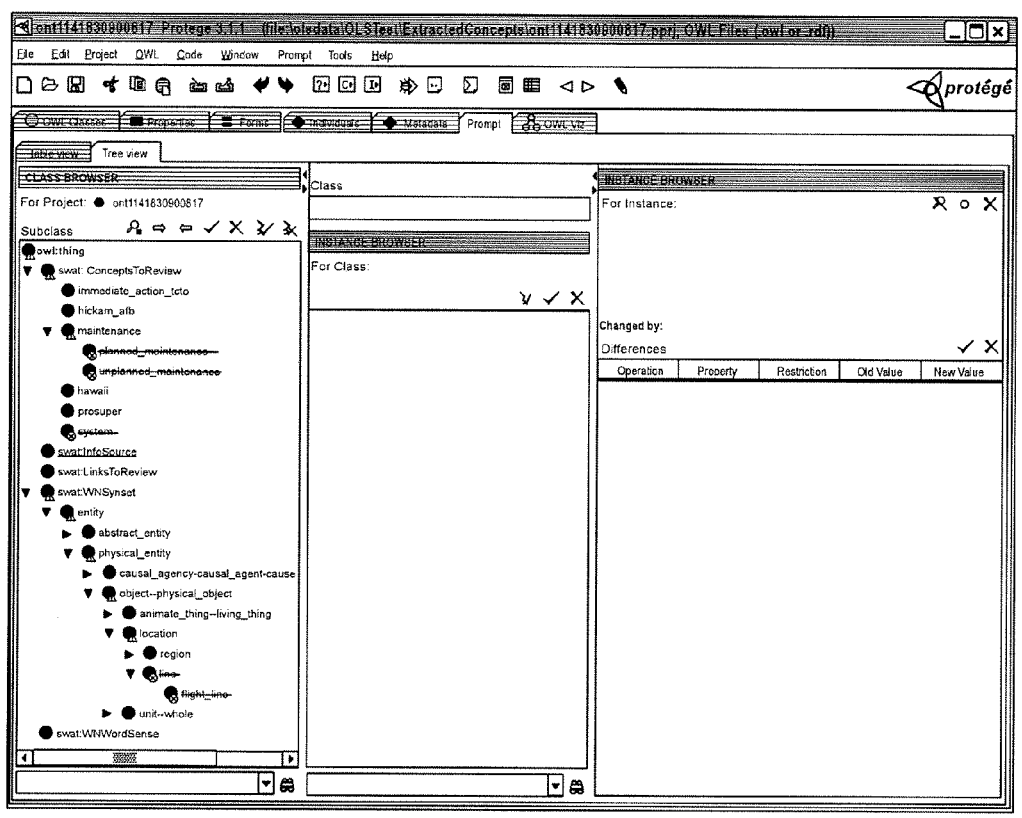
Figure 3T:
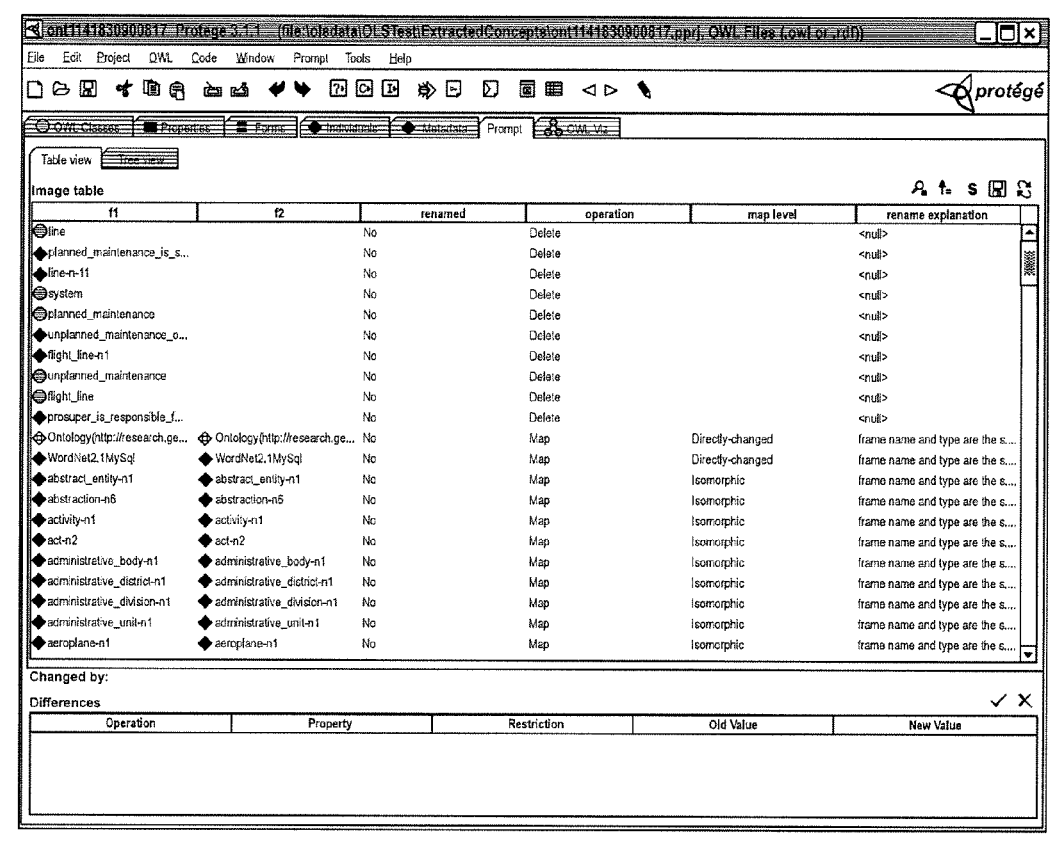
Figure 3U:
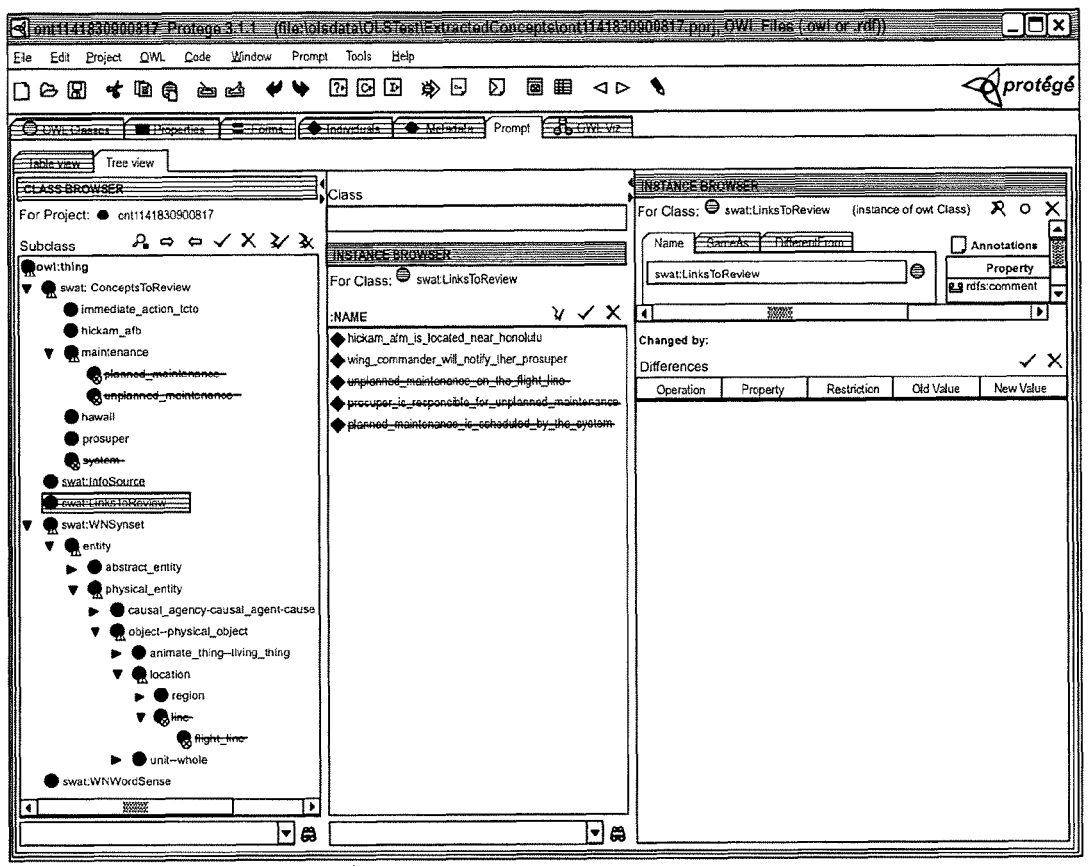

Subsequently, in step 146 the user can compare two ontologies. The screens of FIGS. 3P-3U illustrate various aspects of the comparison. In FIG. 3P an exemplary second file is illustrated which will be compared with the previously structured file. In FIG. 3Q a user can select the "compare" tab or button as the next step in the process. In the screen of FIG. 3R a second ontology can be selected for comparison purposes. Finally, in the screen illustrated in FIG. 3S a comparison of the two ontologies is illustrated via a tree view. In the screen of FIG. 3T a comparison of the two ontologies is illustrated with a table view. Finally, in the screen of FIG. 3U a comparison of the links of the two ontologies is illustrated.

The flow diagram of FIG. 2B illustrates processing 200 for extracting phrases, step 112. An exemplary text fragment 202a is provided as well as exemplary phrases there in, 202b, which can be extracted by the processing 200.

In initial step 204 a plurality of input documents 12 can be combined into one file. Then, in step 206 all text between delimiters such as <tag>, </tag> is deleted. Remaining text is all converted to a lowercase representation.

In step 208 total word count is set to zero and list L1 is set to empty. In step 210 the available text is split into sentence fragments or chunks based on barrier characters. Barrier characters include ".!?;" so that extracted phrases will not span any of the barrier characters.

If all sentence fragments have been processed in step 212, then flow goes to step 214 where for each entry in the list L1 the normalized frequency is determined. In step 216 all entries in List L1 having a normalized frequency value below the preset cutoff limit are deleted. Finally in step 218 the list L1 is sorted based on normalized frequency values to produce the extracted phrases output file and the process returns to step 114, FIG. 2A.

If all sentence fragments have not been processed, step 212 the next sentence fragment is split into words based on non-word characters, step 222. In step 224 the total word count is incremented by the number of words in the respective sentence fragment.

In step 226 all words which incorporate one or more numeric digits are discarded and the list L2 is set to empty. In step 228 all sequences of words up to the user pre-specified maximum phrase length are identified as a phrase and added to the list L2.

In step 232 a determination is made as to whether all entries in list L2 have been processed. If not, in step 234 the next phrase in list L2 is selected.

In step 236 an evaluation is made as to whether the phrase is incorporated in the stop word list. Exemplary stop words include:

Because
The
A
An
About

Additional stop words could be incorporated as would be understood by those of skill in the art. If the phrase is in the stop words list, we check if all entries are processed, step 232. Otherwise, in step 240 a determination is made as to whether the phrase is present in list L1. If not, in step 242 the phrase is added to list L1 with a frequency value of 1. If the phrase is already in list L1, in step 244 the frequency value of that phrase in list L1 is incremented by 1.

The flow diagram of FIG. 2C illustrates processing 300 for extracting core noun phrases, step 116. Region 302 of FIG. 2C illustrates examples of identified core noun phrases from the text fragment 202a. Further, as will become apparent from the subsequent discussion, the core noun phrase processing proceeds without prior knowledge on the part of the methodology 100 as to the relevant concepts of the text being processing. As a result, processing 100 is substantially domain independent.

In addition to be able to extract concepts from the subject documents, without prior identification thereof, acronyms or abbreviations can also be extracted from the text and treated as concepts. An example acronym is TCTO which appears in the list of extracted core noun phrases 302. Similarly, "pro-super" while not in any English dictionary is a concept in the domain of the text fragment 202a of FIG. 2B and can be extracted by the processing 300.

In a step 306 previously extracted phrases in the CombinedFile.txt, step 112 are processed, if not previously stored. Text between tags is dropped and remaining text is converted to lower case, as in step 206.

In step 308 total word count is initialized to zero and list L1 is set to empty or null. Text is split in to sentence fragments based on barrier characters step 310, see step 210.

In step 312 a determination is made as to whether all sentence fragments have been processed. If yes, in step 314, for each entry in the list L1 normalized frequency is determined. In step 316 all entries in list L1 with a normalized frequency below the user preset cutoff are deleted. Finally in step 318 the list L1 of remaining entries is sorted based on normalized frequency and the process returns to step 118, FIG. 2A.

In the event that the all sentence fragments have not been processed, step 312, in step 322 each sentence fragment is split into words based on non-word characters. In step 324 the total word count is incremented by the number of words in the sentence fragment. In step 326 all words with numeric digits are discarded and list L2 is set empty.

In step 328 core noun phrases are identified within the sentence fragment by starting from the left most word in the fragment. A core noun phrase corresponds to the maximal phrase "PHR1 PHR2" in sentence fragment where all words in PHR1 are in the adjective word list 330a. The words in PHR2 are not in the adjective word list 330a, the barrier word list 330b or the verb word list 330c. This processing can identify multiple core noun phrases from a single sentence fragment.

Where all entries in the list L2 have not been processed, step 332, the next phrase in the list L2 is selected in step 334, and then it is determined if the phrase is in list L1 in step 336. If not, that phrase is added to the list L1 with a frequency value of 1, step 338. Otherwise, the frequency value of that phrase in list L1 is incremented by 1, step 340.

The flow diagram of FIG. 2D illustrates processing 400 of link extraction step 122. On FIG. 2D extracted links 402 are illustrated for the text fragment 202a.

In an initial step 404 subject and object word lists 404a, 404b are generated from the file CombinedFile.txt.CNP.csv, from step 318, based on previously established subject and object cutoff parameters. These subject and object word lists are domain specific and have been extracted from the document file. The ability to recognize and extract subject words and object words from the respective document(s) contributes to the versatility and flexibility of the link extraction process 122.

Steps 406, 410 correspond to steps 306-310 as previously discussed. If in step 412 all sentence fragments have been processed, the links of list L2 are sorted based on descending confidence step 414.

In step 416 a determination is made as to whether all entries on the list L2 have been processed. If so, the process returns to step 130. If not, the next entry is selected in step 418.

In step 420 a determination is made as to whether "Seq" (phrase from subject thru object) has an odd number of parenthesis. If so, the processing goes to step 416. Otherwise, in step 422, a determination is made as to whether the components "subject", "predicate" and "object" are already represented in list L1 as part of a prior extraction. If so, processing continues to step 416. Otherwise in step 424, the entry is added to CombinedFile.txt.link.text and processing continues with step 416.

In the event that all sentence fragments have not been processed step 412 the next sentence fragment is selected and the list L2 is set to empty or null, step 428. Step 430 specifies fragment processing to identify instances of "subject", "predicate" and "object".

Subjects and objects are elements that match an entry in the subject file 404a and object file 404b, respectively. As noted above the subject word file for 404a and object word file 404b are based on extracted subjects and objects from the core noun phrase file, step 404. These elements have domain specific characteristics. WordNet also organizes the word senses in various categories called "Category ID". If for some subsequence of the predicate, all the verb senses have the same category ID then that category ID is associated with the extracted link. The WordNet category ID is represented in the VerbCategorized.dat file 404c.

For example, relative to exemplary phraseology 402 the word "prosuper" would appear in the subject word file 404a having been extracted from the core noun phrase file. The number of words appearing between subject and predicate; and between predicate and object must be less than or equal to the gap cutoff parameters previously set. Other details are specified in step 430.

Details of the step 134, generating initial ontology from single-sense phrases in a file, are illustrated in the flow diagram of FIG. 2E of processing 500. Addition of phraseology from the text fragment 202a to the ontology is illustrated in 502 of FIG. 2E.

In step 504 a determination is made as to whether all entries in the CombinedFile.txt.PhrFreq.csv file, step 218 of FIG. 2B have been processed. If so, a determination is made in step 506 as to whether all entries in the instance list have been processed. If so, processing continues in step 136 of FIG. 2A, if not the next entry in the instance list is selected in step 508. In step 510, a determination is made as to whether a term exists in the ontology of which this entry can be an instance. If so, it is added as an instance and processing continues in step 506. Otherwise, processing goes to step 506.

When all of the entries in the combined file, step 504 have not been processed, the next entry is selected for processing, step 516. If the next entry as an instance type in WordNet, step 518, the entry E is added to the instance list step 520. If not, an evaluation is made step 522 as to whether the entry E exists in the ontology. If not, an evaluation is made in step 524 as to the whether the entry E exists in WordNet. If not, in step 526 an evaluation is made as to whether the entry E is the same as its stemmed version. If it is, in step 528 entry E is set to be the stemmed version of E.

An evaluation is made in step 530 as to whether entry E has a single-sense which is a noun. If so the synset associated with entry E and its parent hierarchy are added to the ontology file as in step 532.

Figures 1, 2F:
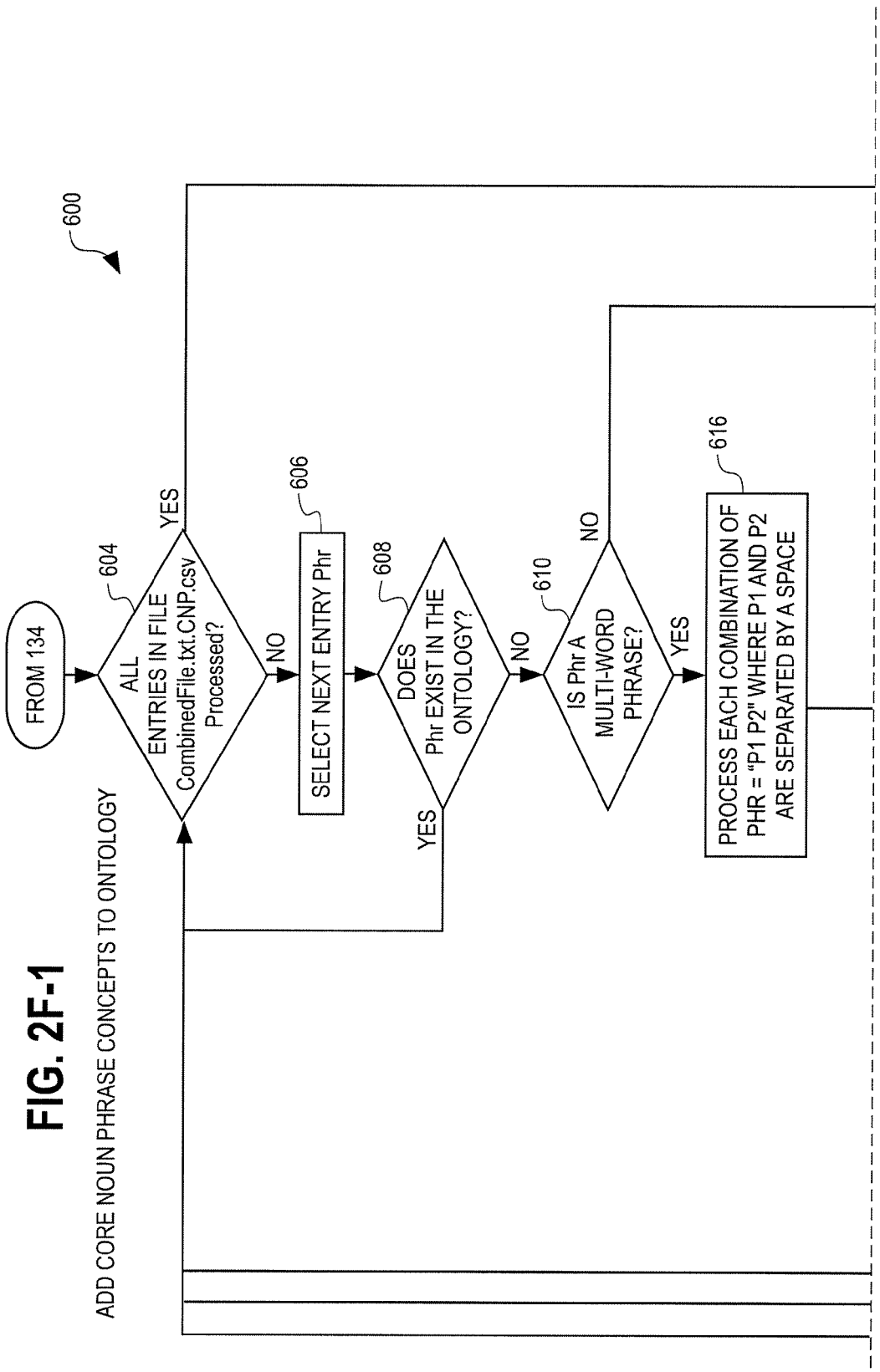
Figure 2H:
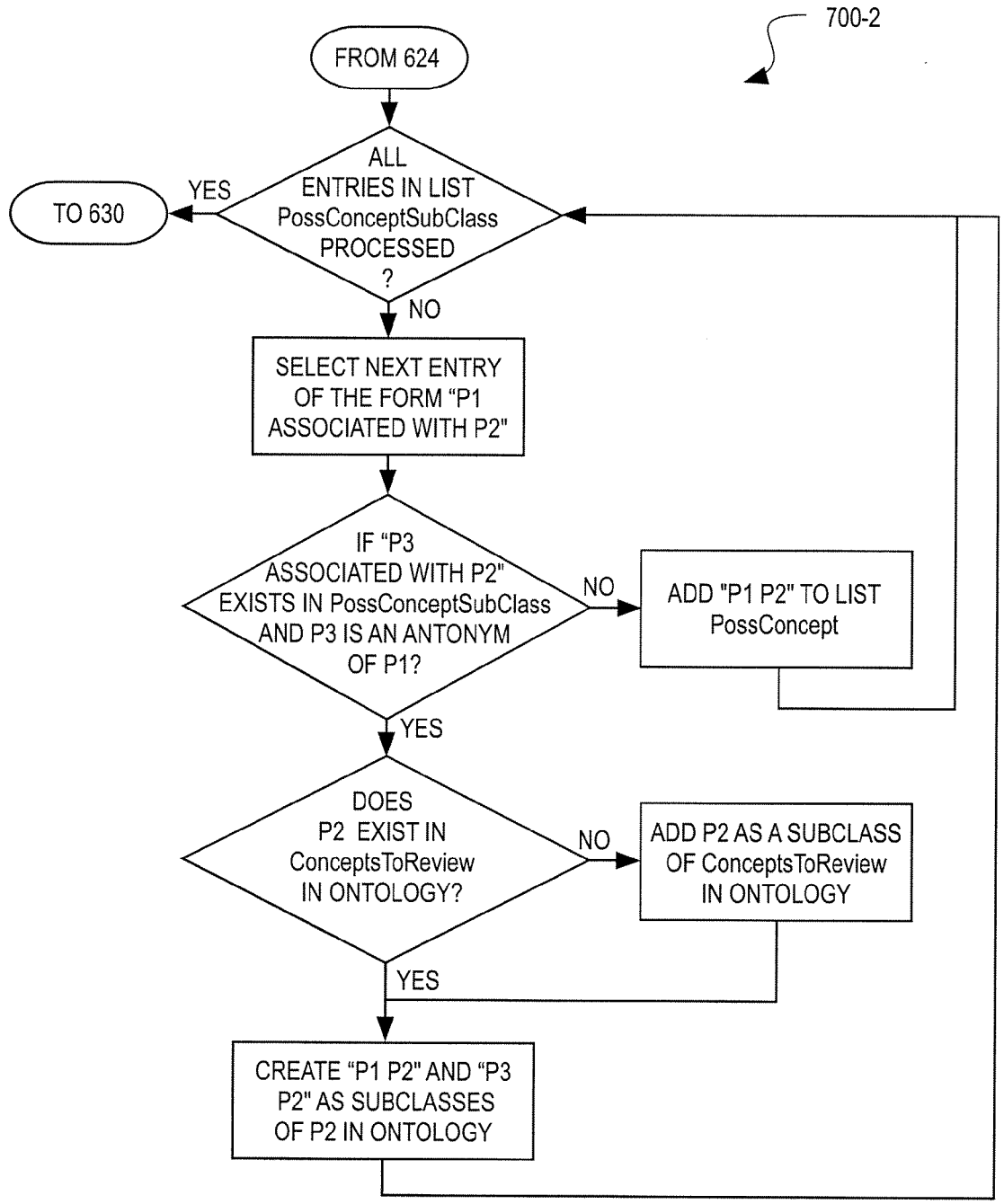
Figure 2J:
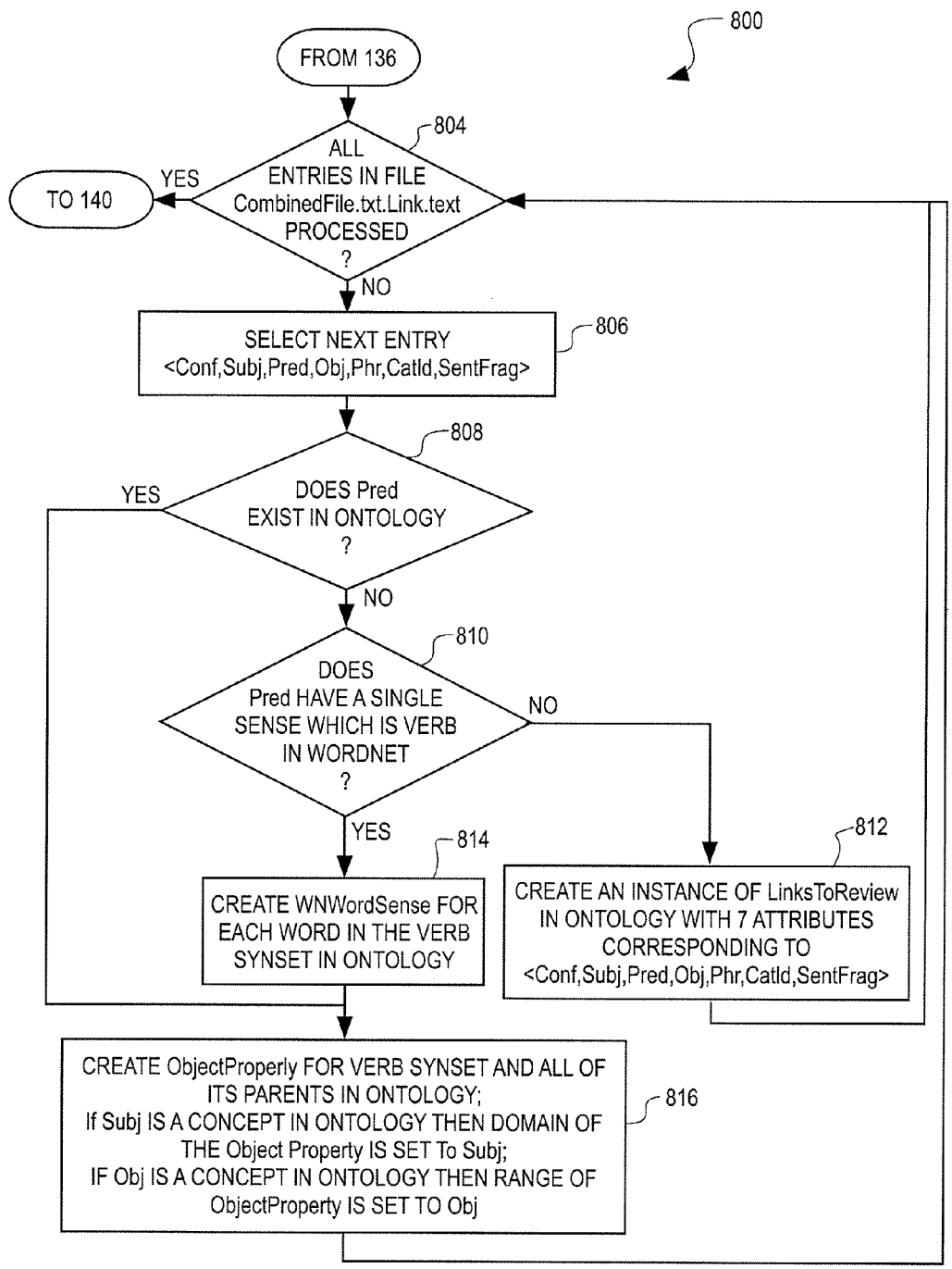

Details of the step 136, add core noun phrase concepts to ontology, are illustrated in the flow diagram of FIG. 2F, processing 600. A determination is made in step 604 as to whether all entries in the core noun phrases file, step from 116, have been processed. If not the next phrase in the file is processed step 606.

A determination is made as to whether the phrase already exists in the ontology, step 608. If not, an evaluation is made as to whether the phrase is a multi-word phrase step 610. If not the phrase is added to list PossConcept, step 612.

If the phrase is a multi-word phrase, each combination of elements P1 P2 are processed where P1 and P2 are separated by a space, step 616. An evaluation is made as to whether element P2 exists in the ontology, step 618. If so, element P1 is associated with P2 in a list named PossOntSubClass, step 620. Otherwise, in step 622 element P1 is associated with P2 in a list named PossConceptSubClass.

In the event that all entries in the file have been processed, step 604, the respective lists PossOntSubClass, PossConceptSubClass and PossConcept are processed respectively in'steps 624, 628 and 630. Details of steps 624, 628 and 630 are illustrated respectively in the flow diagrams of FIGS. 2G, 2H, 2I which respectively illustrate processing 700-1, 700-2 and 700-3. The details of the processing of FIGS. 2G, 2H, 2I would be readily understandable by those of skill in the art after a review thereof. No further discussion of those figures is needed.

Subsequent to processing the PossConcept list 630, previously extracted links, step 122 are added to the ontology, step 138. Details of the processing of step 138 are illustrated in the flow diagram of FIG. 2J, processing 800.

A determination is made, step 804 as to whether any additional entries exist from the link file which need processing. If not, processing continues with step 140.

Where there are additional entries, the next entry is selected, step 806. A determination is made as to whether or not the predicate 'Pred' in the entry exists in the ontology, step 808. If not an evaluation is made as to whether the predicate has a single sense which is a verb in WordNet, step 810. If not an instance is created of LinksToReview in the ontology, step 812. If desired a subject matter expert could review the created instance.

Alternately, in step 814 a WordNet word sense is created for each word in the verb synset in the ontology. Finally, in 816 an object property is created for the verb synset and all of its parents in the ontology.

Ontology processing and structuring of the document is completed as the execution of step 138. If desired, the ontology can be reviewed and compared with other ontologies as discussed previously, step 140.

Figure 4A:
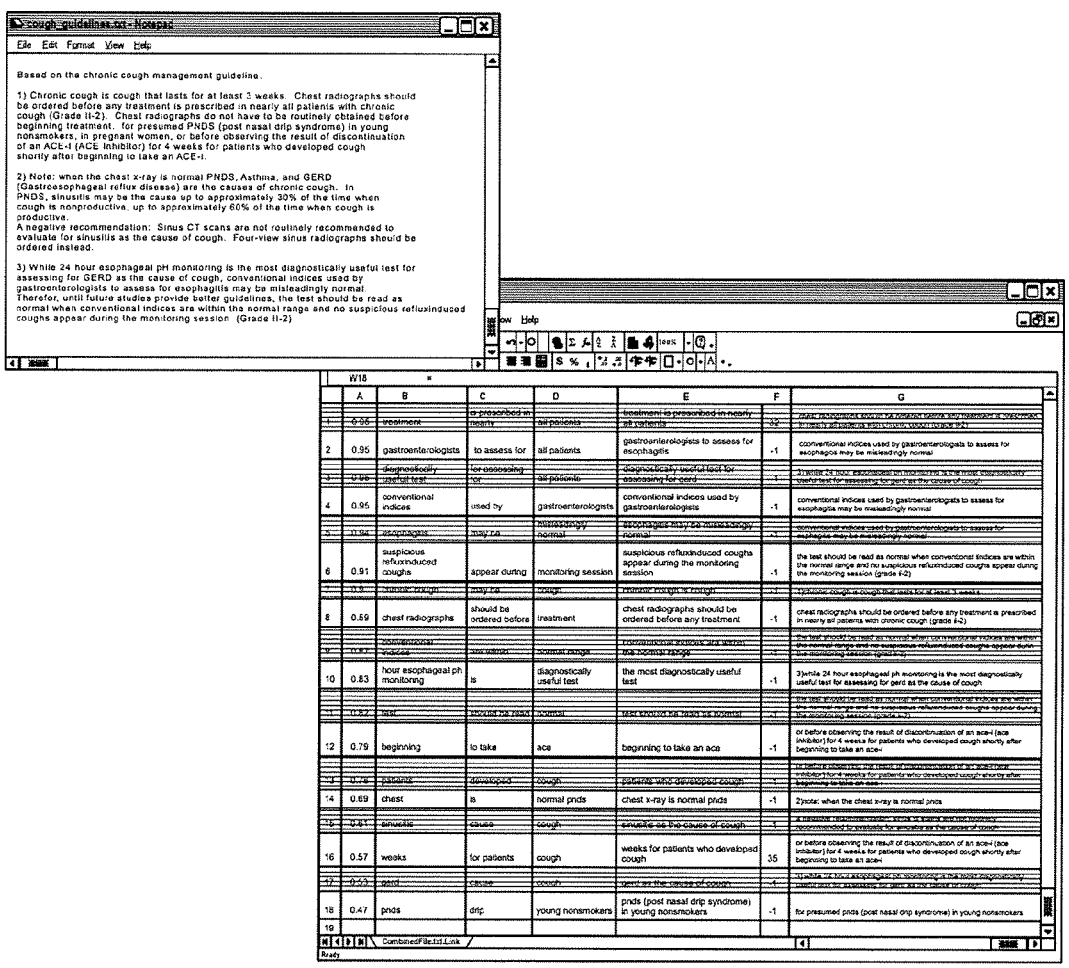
FIGS. 4A-4B illustrate link extraction and ontology processing in accordance with the present invention of an exemplary medical document.
Figure 4B:
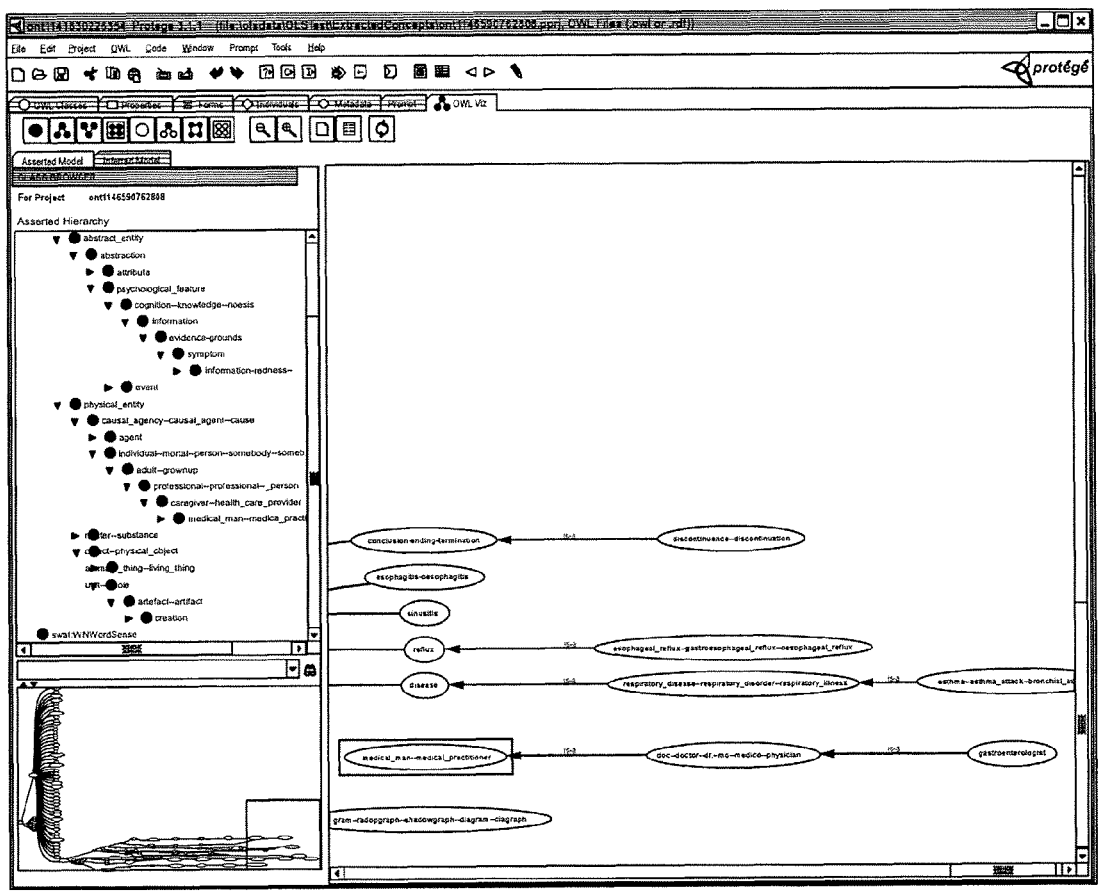

FIGS. 4A and 4B illustrate results of processing a Chronic Cough Management Guideline. The links extracted are shown in FIG. 4A and a portion of the generated ontology is shown in FIG. 4B. These are generated using the processing previously discussed of FIG. 2A. The example of FIG. 4A-4B illustrates the flexibility and the domain independent characteristics of the processing 100 of FIG. 2A.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

The invention claimed is:

1. A domain independent method of creating an ontology comprising:
   a programmable processor automatically extracting phrases from one or more documents independent of a domain of the one or more documents, wherein said extracting of the phrases further comprises separating a portion of a content of at least some of the extracted phrases based upon barrier characters;
   the programmable processor extracting core noun phrases from the one or more documents, wherein a plurality of core noun phrases is identified at least in part based on an absence of each of the plurality of core noun phrases from each of an adjective word list, a verb word list, and a barrier word list;
   the programmable processor extracting links from the one or more documents based at least in part on the plurality of core noun phrases; and
   the programmable processor generating an ontology in accordance with at least the extracted phrases.

2. A method as in claim 1 where generating the ontology includes adding core noun phrases.

3. A method as in claim 1 where generating the ontology includes adding link concepts.

4. A method as in claim 2 where generating the ontology includes adding link concepts.

5. A method as in claim 1 where extracting phrases includes splitting sentences in the documents into fragments.

6. A method as in claim 2 which includes processing fragments into phrases.

7. A method as in claim 6 which includes limiting phrases to a predetermined number of words.

8. A method as in claim 7 which includes creating a frequency indicator for each phrase.

9. A method as in claim 8 which includes removing phrases that fail to exceed a predetermined frequency parameter.

10. A method as in claim 1 which includes establishing a frequency indicator for each of the plurality of core noun phrases.

11. A method as in claim 10 where those core noun phrases whose respective frequency indicator fails to exceed a predetermined threshold are deleted.

12. A method as in claim 1 where extracting the links includes automatically generating subject and object lists from the one or more documents.

13. A method as in claim 12 which includes forming multi-element links that include a subject element, a predicate element and an object element.

14. A method as in claim 13 where the multi-element links are sorted in accordance with a predetermined criterion.

15. A method as in claim 14 where generating includes evaluating each phrase and, in accordance with a first criterion, determining if each respective phrase should be added to the ontology.

16. A method as in claim 15 where generating includes evaluation of each core noun phrase, and in accordance with a second criterion determining if each respective core noun phrase should be added to the ontology.

17. A method as in claim 16 where generating includes evaluating each link, and in accordance with a third criterion determining if at least portions of each link should be added to the ontology.

18. An apparatus comprising:
    a processor including first software, executed by the processor, that analyzes a document and forms an extracted phrases file based on barrier characters identified in the document;
    the processor including second software, executed by the processor, that analyzes the document and forms a core noun phrases file comprising a plurality of core noun phrases independent of a domain of the document wherein the processor identifies the plurality of core noun phrases at least in part based on an absence of each of the plurality of core noun phrases from each of an adjective word list, a verb word list, and a barrier word list;
    the processor including third software, executed by the processor, that analyzes the document and forms a link file based at least in part on the plurality of core noun phrases; and
    the processor including fourth software, executed by the processor, that forms an ontology in accordance with selected phrases in the extracted phrases file.

19. An apparatus as in claim 18 which includes fifth software, executable by the processor, that adds core noun phrase concepts from the core noun phrases file to the ontology.

20. An apparatus as in claim 19 which includes sixth software, executable by the processor, that adds to the ontology link concepts from the link file.

21. An apparatus as in claim 20 which includes a display for reviewing the ontology.

22. An ontology generating system comprising:
    first software, recorded on a non-transitory computer readable medium, that extracts and stores phrases from at least one text source independent of a domain of the text source;
    second software, recorded on a non-transitory computer readable medium, that extracts and stores a plurality of core noun phrases from the extracted phrases, wherein the plurality of core noun phrases is identified at least in part based on an absence of each of the plurality of core noun phrases from each of an adjective word list, a verb word list, and a barrier word list;

third software, recorded on a computer readable medium, that extracts and stores links from the extracted phrases based at least in part on the plurality of core noun phrases; and fourth software, recorded on a computer readable medium, that generates an ontology for the at least one text source.

23. A system as in claim 22 where the fourth software generates the ontology substantially automatically irrespective of a subject matter of the at least one text source.

24. A system as in claim 22 which includes additional software for combining textual material from a plurality of sources to form the at least one text source.

25. A system as in claim 24 which includes at least one processor which executes at least some of the first, second, third or fourth software.

* * * * *